US010234726B2

(12) United States Patent
Banin et al.

(10) Patent No.: US 10,234,726 B2
(45) Date of Patent: Mar. 19, 2019

(54) POLARIZED LIGHT SOURCE DEVICE

(71) Applicants: Yissum Research Development Company of the Hebrew University of Jerusalem Ltd., Jerusalem (IL); Qlight Nanotech Ltd., Jerusalem (IL)

(72) Inventors: Uri Banin, Mevasseret Zion (IL); Ehud Shaviv, Modi 'in (IL); Hagai Arbell, Jerusalem (IL)

(73) Assignees: Yissum Research Development Company of the Hebrew University of Jerusalem Ltd., Jerusalem (IL); Qlight Nanotech Ltd., Jerusalem (IL)

( * ) Notice: Subject to any disclaimer, the term of this patent is extended or adjusted under 35 U.S.C. 154(b) by 0 days.

(21) Appl. No.: 16/017,225

(22) Filed: Jun. 25, 2018

(65) Prior Publication Data

US 2018/0348563 A1    Dec. 6, 2018

Related U.S. Application Data

(62) Division of application No. 15/301,053, filed as application No. PCT/IL2015/050341 on Mar. 31, 2015, now Pat. No. 10,036,921.

(Continued)

(51) Int. Cl.
*G02F 1/1335* (2006.01)
*G02F 1/13363* (2006.01)
(Continued)

(52) U.S. Cl.
CPC ....... *G02F 1/13362* (2013.01); *G02B 5/0242* (2013.01); *G02B 5/0257* (2013.01);
(Continued)

(58) Field of Classification Search
CPC .......... G02F 1/13362; G02F 1/133606; G02F 1/13363; G02F 2202/36; G02B 5/0242; G02B 5/3008; G02B 5/0257
See application file for complete search history.

(56) References Cited

U.S. PATENT DOCUMENTS

| 5,244,713 A | 9/1993 | Nakamura et al. |
| 7,784,954 B1 | 8/2010 | Coleman |

(Continued)

FOREIGN PATENT DOCUMENTS

| WO | 2012/059931 A1 | 5/2012 | |
| WO | WO-2012059931 A1 * | 5/2012 | ....... G02F 1/133617 |
| WO | 2013046130 A1 | 4/2013 | |

OTHER PUBLICATIONS

International Search Report dated Sep. 3, 2015 issued in corresponding PCT/IL2015/050341 application (3 pages).
(Continued)

*Primary Examiner* — Donald L Raleigh
(74) *Attorney, Agent, or Firm* — Millen White Zelano and Branigan, PC; John Sopp

(57) ABSTRACT

A polarized light source configured for use in display device and backlight unit is described. The polarized light source comprising: at least one optically active structure comprising a plurality of nanorods configured to emit light of one or more wavelengths in response to exciting pumping field, said plurality of nanorods comprising nanorods aligned with a predetermined alignment axis so as to produce a desired polarization direction of the emitted light; and a light directing assembly comprising one or more optical elements in optical path of light emitted from the light emitting structure, said light directing assembly being configured to enhance output of the emitted light from the emitting structure while substantially maintaining the polarization of
(Continued)

the emitted light passing therethrough. Preferably, layers associated with the polarized light source are aligned with parallel principal axes.

18 Claims, 10 Drawing Sheets

Related U.S. Application Data

(60) Provisional application No. 61/974,008, filed on Apr. 2, 2014.

(51) Int. Cl.
*G02F 1/1333* (2006.01)
*G02B 5/30* (2006.01)
*G02B 5/02* (2006.01)

(52) U.S. Cl.
CPC ....... *G02B 5/3008* (2013.01); *G02F 1/13363* (2013.01); *G02F 1/133308* (2013.01); *G02F 1/133606* (2013.01); *G02F 1/133617* (2013.01); *G02B 5/3075* (2013.01); *G02F 2202/36* (2013.01)

(56) References Cited

U.S. PATENT DOCUMENTS

| | | |
|---|---|---|
| 2003/0160917 A1 | 8/2003 | Takahashi et al. |
| 2006/0056166 A1 | 3/2006 | Yeo et al. |
| 2007/0140701 A1 | 6/2007 | Riposati |
| 2012/0081782 A1 | 4/2012 | Coleman et al. |
| 2012/0292652 A1 | 11/2012 | Yamae et al. |
| 2014/0009902 A1 | 1/2014 | Banin et al. |
| 2014/0340865 A1 | 11/2014 | Hikmet et al. |

OTHER PUBLICATIONS

Written Opinion of the International Searching Authority dated Sep. 3, 2015 issued in corresponding PCT/IL2015/050341 application (7 pages).

\* cited by examiner

POLARIZED LIGHT SOURCE DEVICE

TECHNOLOGICAL FIELD

This invention is generally in the field of light sources, and relates to a polarized light source device, particularly useful as a backlight unit in a display device.

BACKGROUND ART

References considered to be relevant as background to the presently disclosed subject matter are listed below:
1. US 2011/0299001
2. WO 2012/059931
3. US 2013/0026506
4. U.S. Pat. No. 8,471,969
5. US 2012/0113672
6. WO 2012/021643
7. WO 2010/0155749
8. U.S. Pat. No. 5,825,543,
9. WO 2008/027936
10. U.S. Pat. No. 7,278,775,
11. U.S. Pat. No. 8,033,674
12. "A polarized laser backlight using a zero-zero-birefringence polymer for liquid crystal displays", Takahiro Kurashima, Koichi Sakuma, Takayuki Arai, Akihiro Tagaya, Yasuhiro Koike, Optical Review, Volume 19, Issue 6, pp. 415-418 (2012)
13. U.S. Pat. No. 6,746,130
14. US 2008/0285255
15. U.S. Pat. No. 6,111,696
16. "Novel wide viewing liquid crystal display with improved off-axis image quality in a twisted nematic configuration", Seongmo Hwang et al., Samsung Electronics Co. Ltd, Optical Engineering 48(11), p. 114001 (November 2009).

Acknowledgement of the above references herein is not to be inferred as meaning that these are in any way relevant to the patentability of the presently disclosed subject matter.

BACKGROUND

Flat-screen displays are widely used in various devices such as computers, mobile phones and television sets. Liquid Crystal displays (LCDs) present a major part of flat-screen displays. LCDs utilize back illuminated LC panel, where the LC panel is typically a multi-layer structure and includes a liquid crystal layer configured for modulating transmission of light towards the viewers. Light transmission through each pixel is controlled by changing the polarization state of the liquid crystal.

LCDs utilize polarized backlight illumination. Current color LCD displays use a backlight unit emitting non-polarized, generally white, light (i.e. polychromatic light that has no specific polarization), and a polarizer in the optical path of the emitted non-polarized light. Thus, selection of a particular polarization comes at the cost of energy loss: exemplarily, more than 50% of light emitted by the light source may be lost due to the light passage through the polarizer. This problem is significant for LCD displays, where energy saving is a crucial factor. The problem is further intensified in portable devices (laptops, cell-phones, tablets, etc.) where battery life and increased backlight brightness are important factors.

Backlight illuminators based on emission properties of nanostructures have been developed and are described for example in WO 2012/059931, assigned to the assignee of the present application. According to this technique, an optically active structure is provided, which may be used as colour polarized light source for displays. The structure comprises at least two different groups of optically active nanorods differing from one another in at least one of wavelength and polarization of light emitted thereby in response to a pumping field. The nanorods of the same group are homogeneously aligned with a certain axis of alignment.

GENERAL DESCRIPTION

There is a need in the art in a novel approach for configuring a polarized light source based on emitting nanostructures for maximizing polarization of light interacting with the nanostructures as well as for maximizing output efficiency of the polarized light.

The present invention provides a polarized light source including one or more optically active layers/films comprising aligned nanorods of selected sizes to emit light of certain polarization in response to exciting field (optical or electrical pumping field); and a polarization preserving light (directing/guiding/extracting) assembly. The latter may be integral with the optically active layers/films, or may be external thereto.

It should be noted that generally polarization of light should be preserved for light passing through or interacting with various optical elements commonly used inside an LCD backlight unit. Such optical elements may generally include reflectors, lightguides, diffusers, brightness enhancement film, etc. Thus, the structure and composition of such a polarized light source are to be carefully designed to maintain the desired polarization of output light so the light incident on a liquid crystal layer (e.g. pixel matrix) is kept desirably polarized. To this end, the present invention provides various backlight film stack configurations in order to obtain polarized emission based backlighting by integrating the polarized light source together with complementary optical elements of the backlight unit (BLU).

Further, it should be noted that cost reduction, lower power consumption and improved viewing experience for users are important considerations in the design of LCDs. The polarized light source of the present invention based on polarized emission backlighting, provides for lower power consumption and/or brighter screens. To this end, efficient light emission provided by arrays of aligned nanostructures is accompanied with efficient light extraction from the emitting layer, while maintaining polarization in order to minimize losses. The polarized emission originates from the polarized light source, which includes aligned arrays of anisotropic nanostructures, and in particular colloidal semiconductor nanorods.

For the purposes of a backlight unit, a polarized light source may contain a homogeneous mixture of at least two groups of optically active nanorods, differing from each other in the emission wavelength. Preferably, the layer of such mixture contains green (central wavelength in the range of 520-560 nm) and red (central wavelength in the range of 600-640 nm) emitting nanorods. The polarized light source may be excited by blue light from a pumping light source e.g. LEDs (central wavelength 440-460 nm, preferably 450 nm). The concentration of emitting nanorods in the active layer is adjusted to allow part of the incident pumping light to be transferred through the layer, while exciting the nanorods in the layer to emit the complementary green and red light needed to produce white light. In some configurations, the layer may additionally include blue emitting nanorods, and be configured to emit light in response to ultra-violet pumping light (central wavelength 350-405 nm). In such configuration, the concentration of nanorods is selected to absorb higher portion of the pumping light, and an additional filter may be used for blocking the remaining portion of the pumping light.

It should be noted that emission wavelength of the nanorods is generally determined in accordance with size, geometry of the nanorods, as well as material composition of the nanorods. It should also be noted that generally the suitable pumping wavelength range is determined by appropriate selection of material composition of the nanorods.

In all embodiments of the current invention, the polarized light source includes an optically active structure containing such nanorods (or other anisotropic nanostructures) arranged in one or more layers and being homogeneously oriented along a distinct axis of alignment. In some embodiments, the nanorods can be embedded in a matrix medium, such as a polymer film, adhesives matrix (epoxy), silicone matrices or glass. In some other embodiments, the nanorods can be located/deposited on the surface of a substrate. The alignment of the nanorods along a distinct axis (meaning that the elongated axis is parallel to the alignment axis) can be achieved by several suitable techniques, such as deposition on special chemically or physically treated substrates (for example patterned groove-like pattern), applying electric fields, polymer film stretching or applying mechanical force, or any other known suitable technique of inducing preferred alignment. The alignment of nanorods (by any of alignment techniques) leads to emission of light which is substantially polarized along a distinct axis (also referred to as the "polarization axis").

As indicated above, in some embodiments the polarized light source includes aligned nanorods embedded in a polymer matrix. Examples of such polymers include polymers of Polyacrylamide, polymers of Polyacrylic acids, cyclic olefin copolymers, polymers of Polyacrylonitrile, polymers of Polyaniline, polymers of Polybenzophenon, polymers of poly(methyl mathacrylate), polymers of polyesther, silicone polymers, polymers of Polybisphenol, polymers of Polybutadiene, polymers of Polydimethylsiloxane, polymers of Polyethylene, polymers of Polyisobutylene, polymers of Polypropylene, polymers of Polystyrene and Polyvinyl polymers (Polyvinyl alcohol, polyvinyl butyral). The thickness of the optically active structure in these cases may exemplarily range between 1 μm to 1000 μm (microns, micrometer), or between 1 μm and 300 μm, or preferably between 5 μm and 200 μm. Additionally, the optically active structure may be configured by a substrate carrying plurality of nanorods on a surface thereof. It should be noted that in such configuration, the optically active structure may be of thickness between 0.05 μm to 5 μm and preferably 0.1 μm to 1 μm.

The polarized light source of the present invention containing such optically active medium with aligned nanorods is generally suitable to be incorporated into the backlight unit of any type of LCD devices. Such LCD device may include a bottom polarizer, located between the backlight unit and an LC layer/structure. In this case the polarized light source is placed in the backlight unit in a manner allowing increased transmittance of polarized emitted light through the bottom polarizer. This can be achieved by fixing the orientation of the "polarization axis" to be substantially parallel to the transmittance axis of the polarizer so that significantly higher fraction of the polarized light emitted from the light source is transmitted through the polarizer, as compared with the typical non-polarized backlight unit configuration.

As indicated above, polarization maintaining of light passing through various optical elements commonly used inside a backlight unit of an LCD (e.g. reflector, lightguides, diffusers, brightness enhancement film, etc.) is an open challenge. The present invention provides various backlight film stack configurations required in order to obtain polarized emission based backlighting, using a polarized emissive film together with other complementary optical elements.

More specifically, the invention provides light extraction methods, which maintain polarization of light extracted from the optically active medium (e.g. film); a light redirection film and other backlight optical elements (e.g. brightness enhancement films (BEF), diffusers, lightguides, reflectors, microlens films, reverse prisms films) configured especially to maintain polarization; edge illumination polarized nanorods film; direct bonding of an optically active film to a lightguide; as well as direct bonding of an optically active film to the bottom polarizer of an LC cell.

According to the light extraction methods of the invention, a polarization dependent scattering film is prepared based on mixing aligned emitting nanorods together with birefringent particles/polymers. This is a combination of an anisotropic polarized emissive material (nanorods) together with such anisotropic polarized scattering elements, configured to preserve the polarization of the emitted and extracted light.

In some embodiments, an additional diffusive layer may be used, located in optical path of light emitted from the optically active structure. The diffusive layer may be used for providing uniform illumination and compensate for variation of nanorods density and/or intensity distribution of the pumping light. The diffusive layer is preferably configured with haze factor in the range of 50% to 95%. Additionally or alternatively, the diffusive layer may be attached to the surface of the optically active structure. In these configuration the diffusive layer is configured to increase uniformity of pumping light, when back pumping is used, and/or to increase light extraction efficiency by varying directionality of light emitted from within the layer.

As indicated above, in some embodiments, the edge illumination of polarized nanorods film is used, and/or a polarization preserving lightguide and/or a reverse prism film to maintain the polarization of light emitted by the nanorods.

Thus, according to a broad aspect of the invention, there is provided a polarized light source comprising:
at least one optically active structure comprising a plurality of nanorods configured to emit light of one or more wavelengths in response to exciting pumping field, said plurality of nanorods comprising nanorods aligned with a predetermined alignment axis so as to produce a desired polarization direction of the emitted light; and
a light directing assembly comprising one or more redirecting optical elements in optical path of light emitted from the light emitting structure, each of said one or more redirecting optical elements being configured to affect direction of propagation of a light interacting with said redirecting optical element while substantially not affecting polarization of said light, said light directing assembly being thereby configured to enhance output of the emitted light from the emitting structure by optimizing polarization (e.g. direction and/or state of polarization) and intensity distribution of output light.

In some embodiments, the optically active structure comprises a host matrix structure in which the emitting nanorods are embedded. The matrix structure is configured to enhance the output of the emitted light therefrom while substantially maintaining the polarization characteristics of the emitted light while passing through the matrix structure. The host matrix structure may for example comprise a host material and scattering particles mixed with the nanorods, and the configuration is such that the host material and the scattering particles have different birefringence. For example, the host material (matrix) has zero or relatively low birefringence as compared to a difference between the fast and slow axes birefringence of the scattering particles; or the scattering particles have zero or relatively low birefringence as compared to a difference between the fast and slow axes birefringence of the host material. In this connection, the term "low birefringence" is used to indicate a minimal difference between the refractive indices of the different principal axes (slow and fast axes) of the material composition of the host matrix, such that the accumulative induced retardation is minimal as follows.

It should be noted that generally the polarization direction of light passing through a certain material is determined by the retardation induced by the material. More specifically, the retardation is defined as the difference in optical path of light components having polarization along the fast and slow axes of the material, i.e. ($\Delta n * d$) where $\Delta n = |n_o - n_e|$, and d is the thickness of the layer. Generally according to the present invention, retardation induced by the optically active structure does not exceed 100 nm and is preferably below 50 nm, and even more preferably the retardation of the optically active structure may be below 25 nm.

Generally, the scattering particles may be configured (e.g. oriented with respect to alignment axis of said nanorods in case of anisotropic particles) to provide refractive index matching for light components having polarization orientation perpendicular to said alignment axis while providing mismatch in refractive index for light components polarized along said alignment axis.

In some embodiments, the light directing assembly comprises a diffuser located in an optical path of pumping light propagating towards the emitting structure.

The light directing assembly may comprise a diffuser located in an optical path of the emitted light propagating from the emitting structure.

Generally, either the diffuser in optical path of pumping light towards the optically active structure and the diffusive layer in optical path of light emitted from the optically active structure when used are preferably configured with haze factor between 50% to 95% and more preferably between 80% and 95%. Additionally or alternatively, these diffusers may be attached to the optically active structure from either side thereof.

In some embodiments, the polarized light includes an optical pumping assembly producing the pumping light. The optical pumping assembly is generally configured to generate and direct pumping light for exciting said optically active structure. The optically active structure and the optical pumping assembly may be configured such that the pumping light enters the emitting structure along an axis substantially parallel to a light output direction of the polarized light source (backlight pumping light assembly); or may be configured such that the pumping light enters the emitting structure along an axis substantially perpendicular to a light output direction of the polarized light source. Thus, the pumping assembly may be configured to provide either direct backlight pumping and/or side illumination pumping (edge lit backlight unit).

The optical pumping structure may include a lightguide for receiving a pumping light from a pumping source and directing it towards the emitting structure.

As indicated above, the light directing assembly generally comprises one or more optical elements for redirecting light emerging from the emitting structure. The light redirecting optical element may be configured for directing light components emitted from the optically active structure to thereby optimized polarization and intensity distribution of light output from the device. The light redirecting optical elements may preferably comprise optical elements such as: light recycling optical elements, reflective layer and diffusive layer. The light redirecting optical elements may also be configured to be aligned such that a principal axis thereof is parallel to axis of alignment of the nanorods. Thus the fast or slow birefringence axes are substantially parallel or substantially perpendicular to the alignment axis of the emitting nanorods thereby preserving the polarization characteristics of the emitted light. Additionally or alternatively, the light redirecting optical elements may be configured with reduced retardation, preferably below 100 nm, and more preferably below 50 nm.

According to yet some embodiments of the invention, the optically active structure may comprise a protective layer structure configured to provide at least one of mechanical support, strain protection and chemical protection to said optically active structure. Said protective layer structure may be configured with at least one of the following configurations: said protective layer structure is oriented such that a principal axis thereof is parallel to said axis of alignment of said nanorods; and said protective layer structure is configured to induce retardation below 100 nm.

According to yet some embodiments of the invention, the optically active structure may comprise a protective layer configured to provide at least one of mechanical support or strain protection and chemical protection to said optically active structure; said protective layer being configured to induce retardation below 100 nm.

Generally, the protective layer may be configured as at least one of the following: a transparent encapsulating layer, barrier layer and mechanical support film.

According to some embodiments, the present invention provides a polarized light source as indicated above; wherein said at least one optically active structure and said light directing assembly defining together an optical stack arrangement comprising at least two layers oriented such that principal axes of birefringence of said at least two layers are parallel to one another. The optical stack thereby substantially preserving predetermined polarization properties of light emitted from the optically active structure and passing through said optical stack.

According to yet some embodiments, the present invention provides a display device comprising the polarized light source described above and a spatial modulating unit configured for varying spatial distribution of output light of the polarized light source to thereby provide a displayed image.

According to one other broad aspect of the invention, there is provided an optical stack arrangement, suitable for use in an illumination device. The optical stack arrangement comprises one or more layers oriented such that principal axes of birefringence of said one or more layers are parallel to each other; said optical stack thereby substantially preserving predetermined polarization properties of light passing therethrough. The optical stack may further comprise at least one diffusive layer configured for increasing uniformity of light passing therethrough.

The optical stack may comprise an optically active structure comprising a plurality of nanorods aligned along a predetermined axis being parallel to said principal axes of the optical stack.

According to one other broad aspect of the invention, there is provided a backlight unit for use in a display device, the backlight unit comprising a pumping light source and the optical stack as described above.

According to one other broad aspect of the invention, there is provided a display device comprising the above described backlight unit and a spatial modulating unit (for example liquid crystal cell) configured for varying spatial distribution of emitted light to thereby provide a displayed image.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which:

FIG. 4A illustrates the light propagation scheme for external light incidence upon a film that contains no scatterers and the cone of light beams with angles smaller than the critical angle for Total Internal Reflection, and FIGS. 4B and 4C illustrate light propagation scheme for light rays emitted by nanorods inside the optically active structure of the present invention;

DETAILED DESCRIPTION OF EMBODIMENTS

Figure 1:
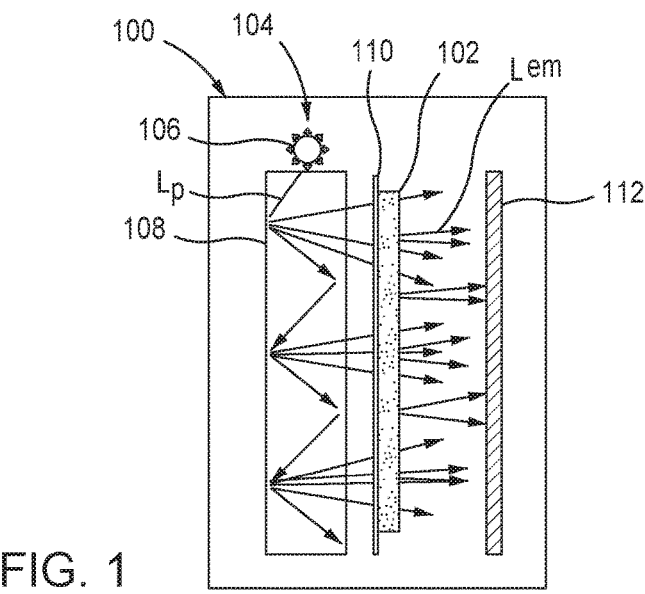
FIG. 1 illustrates schematically a polarized light source device based on a diffuser optically attached to the optically active layer which contains the nanorods.

The present invention provides a novel polarized light source, which is particularly suitable for use in a backlight unit of a LCD device, and a LCD device utilizing such polarized light source. The polarized light source of the invention includes an optically active structure including at least one layer of aligned emitting nanostructures excitable by a pumping field (optical and/or electrical) and polarization preserving assembly, which includes one or more elements integral with (embedded in) the optically active structure and/or one or more elements external to the optically active structure.

In the description below, the optically active structure is for simplicity termed "film", but it should be understood that such structure may be a single- or multi-layer structure. It should also be noted that such a film may be formed by layers with nanostructures emitting light of different colors. Also, such a film may include nanomaterial structure(s)/layer attached to another layer providing a substrate of the emitting nanomaterial. More specifically, according to the present invention the optically active structure may be configured from a matrix (e.g. polymeric matrix) in which a plurality of emitting nanorods is embedded or a substrate on which the plurality of nanorods is deposited. Also, the optically active structure may be configured of two or more layers including one or more matrix layers carrying nanorods emitting light at different wavelength ranges. Additionally, such bi- or multi-layer configuration may be used for nanorods deposited on a substrate, i.e. bi- or multi-layers including two or more layers of substrate on which nanorods are deposited. Generally, a combination of nanorods embedded in a matrix and nanorods deposited on a substrate may also be used.

Also, the term barrier or protection layer used herein refers to a layer or coating material applied onto the optically active structure and configured to provide mechanical support and/or chemical protection to the optically active structure. In this connection it should be noted that in embodiments where the optically active structure includes nanorods deposited on a substrate, a protection layer is preferably applied onto the nanorods to prevent oxidization, wear and other chemical damage to the nanorods. In addition to the protective layer, as well as in embodiments utilizing nanorods embedded in a matrix, a barrier layer or coating material may also be applied onto the optically active structure. Such barrier layer/coating may be applied at either one or both sides of the optically active structure. In some cases multiple protection layers can be used (e.g. a layer to protect from oxygen, a layer to protect from water)

Also, in the description below, the elements of the polarization preserving assembly are at times referred to as light extracting and/or "light enhancement and/or light recycling. It should however be noted that, generally, such elements form a light directing assembly that is configured to enhance output of the emitted polarized light from the emitting structure while substantially maintaining the polarization characteristics of light interacting with elements of the light directing assembly. In this connection, it should be understood that the polarization characteristics to be maintained actually include both the polarization and polarization direction. More specifically, both polarized light intensity as well as the direction of polarization should be at least partially maintained. Further, it should be understood that such light directing assembly may be incorporated in the optically active structure, or be formed as an independent/separate assembly, or some of the elements of the light directing assembly may be incorporated in the optically active structure and some be external thereto.

Thus, in the polarized light source device of the invention, a film (constituting an optically active structure including one or more layers of aligned emitting nanostructures) may include various light directing elements on one or both surfaces of the structure (film). Such light directing elements may include one or more of the following: prisms, pyramids, microlens, microlens array, metallic reflecting surface, etc., which are configured to enhance the output of the emitted polarized light from the emitting structure while substantially maintaining the polarization and polarization direction of light emitted from the film. The film may be configured with various structures/interfaces having selected different refractive indices assisting in the light direction and polarization preservation (e.g. gradient-index lens-like structures). The light directing assembly may include one or more polarization preserving diffuser films attached to the optically active structure from one or more sides thereof. The optically active film may additionally or alternatively include various combinations of light scattering particles of regular and non-regular shape that may enhance the polarization properties.

The optically active structure may include a host matrix in which the aligned emitting nanorods are embedded. It should be noted that in such configuration, light emitted from the embedded nanorods might be substantially trapped within the matrix due to total internal reflection (TIR) at the matrix/surrounding (e.g. air) interface. In order to increase the efficiency of the polarized light source, light extraction techniques can be used for efficient out-coupling of the emitted light as well as for suppressing the waveguide behavior of the matrix.

It is generally known to mix high concentrated (up to 1% wt) scattering particles (such as TiO2, SiO2, BaTiO3, BaSO4, and ZnO) within the emitting structure. However, such highly diffusive matrices depolarize light due to the isotropic scattering characteristics. Hence, this known technique by itself is less preferable in a light source of the invention, where the emitting structure is to emit polarized light.

Reference is made to FIG. 1 exemplifying the technique of the invention for efficiently extracting and directing light from the polarized light emitting structure, i.e. maximizing the extraction of emitted polarized light from the emitting structure, while preserving the polarization characteristics of the emitted light. In this example, polarization preserving light directing of light from the nanorods layer is facilitated by using a diffusive layer attached (bonded) to a backside (light input side) of the optically active structure, to cause light emitted from nanorods within the structure to brake conditions for total internal reflection to thereby cause light to escape the optically active structure (film) through a surface of the structure opposite to that of the diffuser. It should be noted that such diffusive layer may additionally or alternatively be attached to front side (light output side) of the optically active structure. As shown, a light source device 100 includes an optically active structure 102 in the form of aligned nanorods film, which is associated with a pumping unit 104. In this example, the pumping unit 104 includes an optical pumping source 106, e.g. a blue LED, optically coupled to an edge of a lightguide 108. Further provided in the device 100 is diffusive layer 110 bonded to a back surface of the structure/film 102, by which it faces the light output surface of the lightguide 108. Pumping light $L_p$ is thus out-coupled from the lightguide 108 and into the nanorods film 102 by the diffusive layer 110. The diffusive layer 110 eliminates total internal reflection and increases the emission $L_{em}$ (e.g. red and green emission) from the nanorods film 102. The emitted light $L_{em}$ from the nanorods film 102 is then passed through another polarization preserving diffuser 112 to improve brightness uniformity thus optimizing intensity distribution of the emitted light.

Thus, in this example, the light directing assembly may include a diffusive layer, e.g. having haze range between 50% and 95% and more preferably between 80% and 95%. The diffusive layer is configured and operable to cause light scattering while at least partially maintain polarization of light components. It should be noted that the diffusive layer is preferably configured to fully maintain the polarization of scattered light. This diffusive layer eliminates, or at least significantly reduces the effect of total internal reflection and increases the forward emission of light from the polarized light source (e.g. both the pumping light and the optically active structures). Generally the diffuser may be configured of several diffusing layers cascaded one on the other, and/or diffusing layers attached to back and front sides of the optically active film. For example, such a polarization maintaining diffusive layer can be based on acrylic polymers, like those used in "Scotch® Magic™ Tape" commercially available from 3M. It should however be noted that the diffusive layer may be made of any suitable transparent or semi transparent material configured to preserve polarization of diffused light. Such diffusive layer may contain one or more rubber layers, silicone layers or modified acrylic based polymer layers.

Generally, the invention may also utilize the polarization preserving light directing assembly by obtaining polarized scattering, for which light in the polarization axis is scattered instead of being trapped by total internal reflection within the optically active unit. Various configurations for achieving polarized scattering are known in the art. In the present invention, the anisotropic emitting nanoparticles, such as nanorods used for providing polarized optical emission, may be incorporated into a scattering medium (film) having anisotropic polarization scattering properties, designed to scatter the polarized emitted light while maintaining polarization. Generally, scattering properties of the medium, or of scattering particles embedded therein, may be tailored such that light components of certain selected polarization state undergo scattering while the scattering medium is substantially invisible/transparent to light components of the orthogonal polarization state.

In some embodiments the scattering medium is configured in the form of non-birefringent scatterers embedded in a birefringent film (matrix). In some other embodiments, birefringent scatterers are embedded in a non-birefringent film-matrix are used. In this connection, it should be understood that, generally, both the scatterers and the matrix can be birefringent at some extent, but with a certain difference in the birefringence thereof. In other words, either the scatterers or the matrix material is considered as birefringent phase and the other is considered as a non-birefringent phase, where the non-birefringent phase has a relatively low birefringence as compared to the birefringent phase, i.e. as compared to a birefringence difference between the two axes of the birefringent phase. For example, if the matrix has refractive indices $n_{1e}$ and $n_{1o}$ and the scatterers have refractive indices $n_{2e}$ and $n_{2o}$, the scattering medium is preferably configured such that at least one of $\Delta n_e = |n_{1e} - n_{2e}|$ and $\Delta n_o = |n_{1o} - n_{2o}|$ is much smaller than the other.

Figure 2:
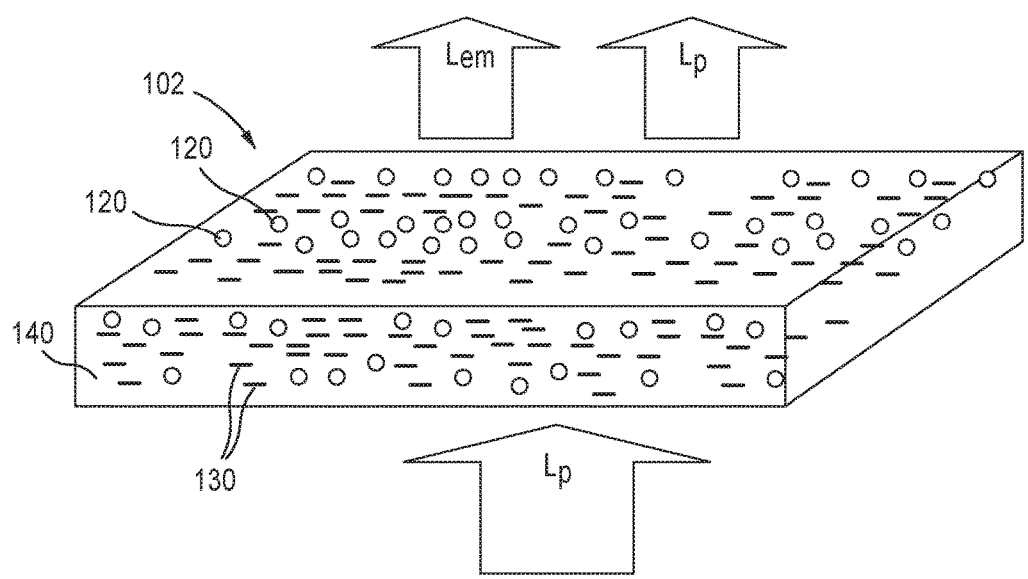
FIGS. 2 and 3 show two examples respectively of the configuration of an optically active structure of the invention, wherein aligned emitted nanorods are embedded in host matrix and are mixed with scattering particles.
Figure 3:
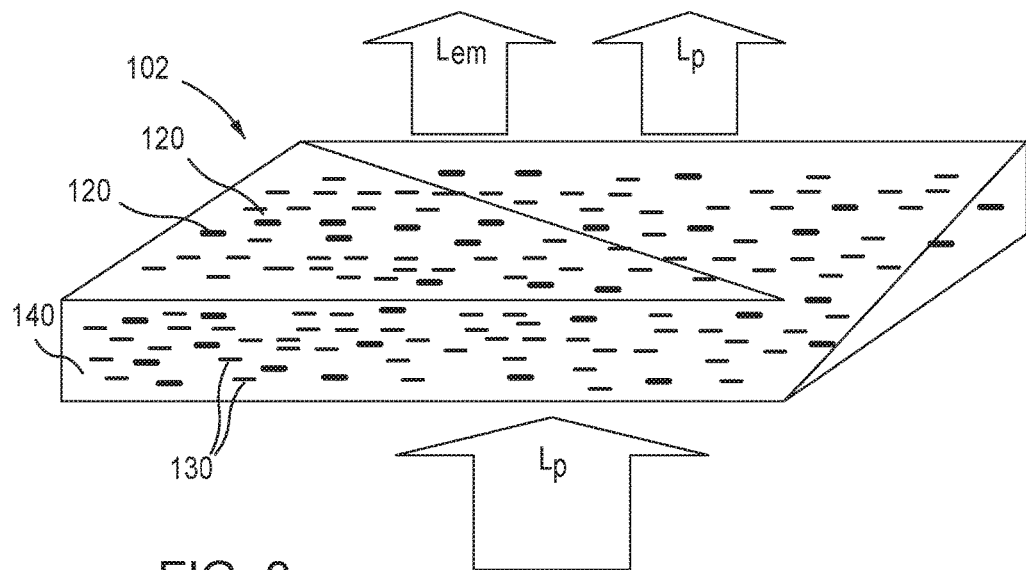

According to some embodiments, the polarized light source may include an optically active structure/film 102 including a mixture of aligned nanorods and scattering particles dispersed in a birefringent host polymer matrix. This is exemplified in FIGS. 2 and 3. In these examples, the scattering particles are configured for isotropic and polarization independent scattering (FIG. 2) or configured for selective scattering utilizing appropriate birefringence characteristics (FIG. 3). In this configuration as shown in FIG. 2, an optically active structure 102 is configured as a polarized scattering film made from birefringent host polymer matrix 140 in which aligned nanorods 130 are embedded in a mixture with scattering particles 120. The scattering particles 120 are generally isotropic and non-birefringent. Generally, the scattering particles (scatterers) may be configured of any shape, e.g. the scatterers may be spherical, elongated or of any geometrical shape. The refractive indices of the host polymer matrix 140 and of the scatterers 120 are selected to provide matching refractive indices for one polarization direction, while providing certain refractive index mismatch along the other axis. More specifically, the polymer matrix 140 has refractive index $n_o$ and $n_e$ for the ordinary and extra-ordinary axes and is preferably configured such that the axis of alignment of the nanorods 130 is parallel to one of the ordinary and extra-ordinary axes of the matrix 140. Additionally, the scatterers 130 are configured from a material having refractive index $n_s$, which is selected to be as close as possible, and preferably equal, to at least on the $n_o$ and $n_e$ of the matrix 140. This provides that along one axis of light polarization (e.g. the extra-ordinary axis being x-axis) there is a refractive index mismatch causing scattering of light, while along the orthogonal axis the refractive indices match and eliminate, or at least significantly reduce, the scattering. This refractive index mismatch is configured to provide efficient scattering of polarized light emitted from the nanorods, such that the emitted light is out-coupled from the matrix 140. Along the orthogonal axis, e.g. y-axis, the refractive indices of the matrix and scatterers are substantially matched to eliminate or at least significantly reduce scattering of light in the corresponding polarization state. Thus, light components of the preferred polarization (e.g. along the x-axis) are out-coupled away from the matrix 140, and light components of the orthogonal polarization direction are generally transmitted through the matrix or trapped therein by total internal reflection. It should be noted that birefringence of the host polymer matrix 140 and the alignment of the nanorods 130 may for example be obtained simultaneously by mechanical stretching of host polymer matrix 140. Thus, as indicated above, in this configuration, the refractive indices of the scattering particles 120 is chosen so that the continuous matrix 140 and the scattering particles 120 are substantially mismatched in one axis (the polarization axis) and substantially matched in the orthogonal axis. This configuration leads to increased scattering of light along the polarization axis of the aligned nanorods which leads to preferential light extraction of the desired polarization. The orthogonal polarization is transmitted through the scattering phase and trapped by TIR. The indices of refraction of the host matrix and the dispersed particles may typically differ by less than 0.03 in the match direction, more preferably less than 0.02, most preferably less than 0.01. The indices of refraction of the host and the dispersed phase preferably differ in the mismatch direction by at least 0.03, more preferably at least 0.1 most preferably at least 0.2.

In another example, the nanorods may be mixed in a non-birefringent host matrix together with aligned anisotropic scatterers, which exhibit birefringence effects. This is exemplified in FIG. 3 showing an optically active film 102 made of a polymeric host matrix 140 that includes aligned nanorods 130 and anisotropic scattering particles 120. Here, the optically active structure is configured as a polarized scattering film 102, and includes a host polymer matrix 140 with emitting nanorods 130 embedded therein being mixed with anisotropic particles 120. Both the anisotropic scatterers and the nanorods are aligned in the host matrix 140 along a preferred axis, e.g. the x-axis. More specifically, the longer axis of anisotropy of the scatterers is parallel to the polarization axis of the nanorods. The anisotropic particles 120 are selected to have refractive indices along the corresponding ordinary and extra-ordinary axes, such that along one axis the refractive index matches that of the polymer matrix 140 and along the other axis (axis of anisotropy) the refractive indices of the particles 120 and the matrix 140 mismatch. This leads to efficient scattering of light polarized along the preferred axis (x-axis), which is parallel to the alignment of the nanorods. Along the orthogonal axes (e.g. y-axis), the indices of refraction of the particles and the host matrix are matched so light polarized along this axis is transmitted through the film and trapped by total internal reflection. Thus, in this configuration, the refractive indices' mismatch exists for light along the polarization axis while for the orthogonal axis the refractive indices are matched. The indices of refraction of the host matrix and the dispersed particles differ by less than 0.03 in the matched direction, more preferably less than 0.02, most preferably less than 0.01. The indices of refraction of the host matrix and the dispersed phase preferably differ in the mismatch direction by at least 0.03, more preferably at least 0.1, most preferably at least 0.2.

In both configurations as described above, light components polarized along the polarization axis of the aligned nanorods scatter due to the index mismatch between the dispersed particles and the host matrix. Light polarized perpendicular to the polarization axis is transmitted through the film due to index matching between the two phases. This leads to efficient out-coupling of polarized light from the polarized light source. The dispersed phase may include anisotropic scatterers such as polymer fibers or elongated polymer particles, or, alternatively, inorganic anisotropic shaped particles. In some embodiment, the nanorods can be embedded inside the anisotropic scatterers.

As indicated above, various polarized scattering techniques are known. These are described for example in the following patent publications: U.S. Pat. No. 5,825,543, WO 2008/027936, U.S. Pat. No. 7,278,775, and U.S. Pat. No. 8,033,674. According to these techniques, the concentration of scatterers is preferably high, i.e. 5 to 15% by volume and more preferably 15% to 30%, and the refractive index mismatch in the required plane is at least 0.07. In such films, for light incident onto the film, the angle of refraction at the interface with the film is lower than the critical angle for total internal reflection (based on Snell's law). This means that a light path through the film for not-scattered or weakly scattered light is in the order of the film thickness (few tens of microns). For this reason, the concentration of scatterers is generally relatively high and even in the case of highly scattered light it is within a multiple of the film thickness.

Figure 4A:
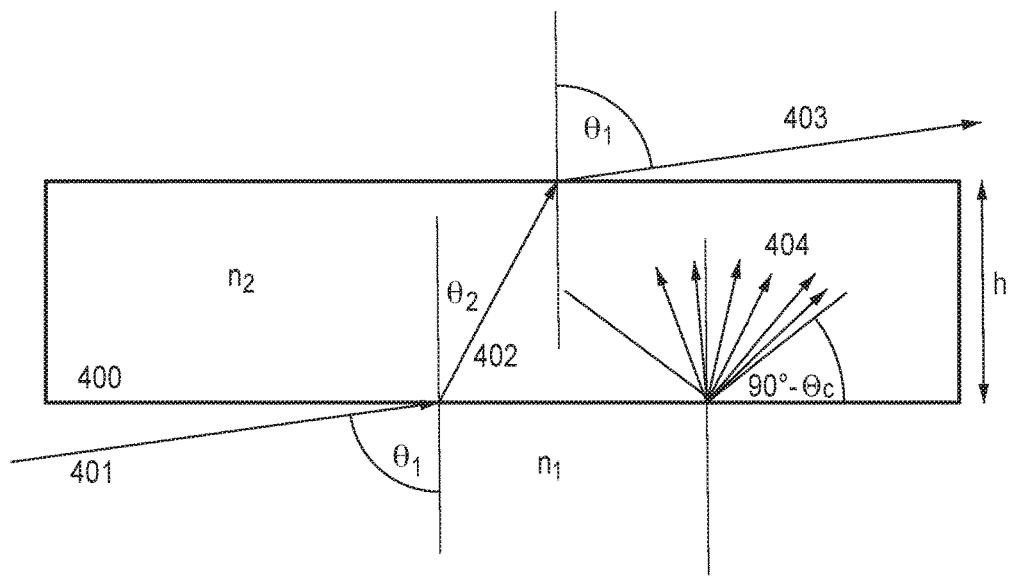
FIGS. 4A to 4C schematically illustrate the principles of using scattering particles mixed with the aligned nanorods, where
Figure 4B:
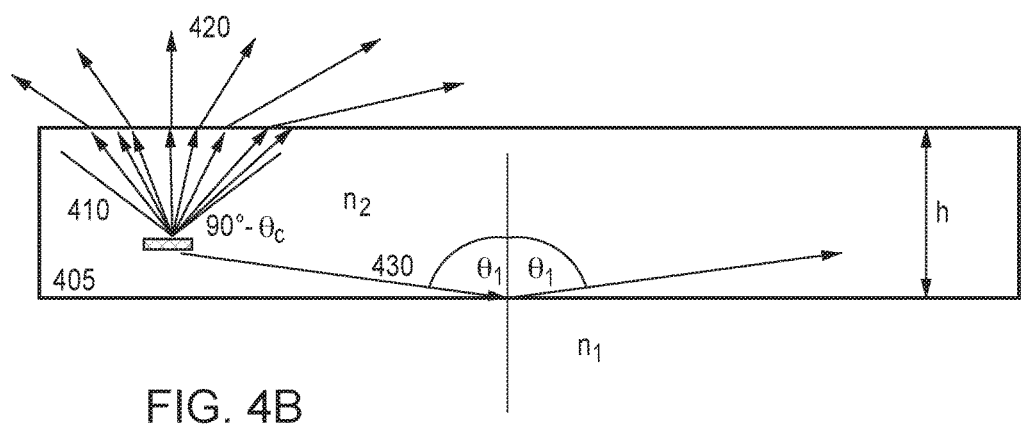
Figure 4C:
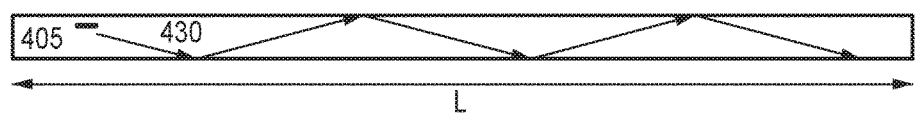

Some characteristics of light scattering, refraction and trapping within the film are exemplified in FIGS. 4A-4C. FIG. 4A schematically shows transmission of light through a film/structure 400 and FIGS. 4B and 4C show propagation of light components emitted from a nanorod embedded within the film/layer. FIG. 4A shows a light-ray 401 travelling in air ($n_1$=1) and impinging on the film ($n_2$) at an angle $\theta_1$; as shown, the light-ray is refracted at an angle $\theta_2$ upon entrance to the film. This refracted ray travels within the film having a refractive index $n_2$, and is refracted again at the interface while being transmitted out of the film to propagate at an angle $\theta_1$ into the air. Based on Snell's law, in the general case, when refractive index of the film is higher than that of the surroundings, all the incident rays are refracted at an angle smaller than the critical angle for total internal reflection into the film. FIG. 4A also shows a cone of angles 404 indicating the possible angular range for light-rays entering the film from the surroundings. Light-rays propagating inside the film in these angles are not confined and will out-couple away from the film (assuming parallel interfaces). All the rays inside the cone will not undergo total internal reflection and therefore their path within the film is of the magnitude of the film thickness h (the lower limit is h and the upper limit is ~h/cos($\theta_c$), e.g. ~1.34*h for typical polymers with refractive index of 1.5).

FIGS. 4B and 4C illustrate propagation path of light components emitted by a nanorod located within the film. These figures exemplify the optically active structure (film) 405, which includes an internal source of emission formed by nanorods embedded therein. In other words, emission (e.g. red, green and possibly blue color wavelengths) originates from the emitting nanorods embedded in the optically active structure. Therefore, emitted light rays 410 from the nanorods impinging the film-air interface at various angles being above and below the critical angle for TIR. Light components reaching the interface below the critical angle for total internal reflection are extracted from the film. However, due to the nature of the emission from the nanorods, a large portion of light rays, such as ray 430, impinge upon the interface at angles larger than the critical angle for total internal reflection and are trapped within the film. Thus, a significant portion of the emitted light might be trapped within the film, and suitable extraction elements may be required to optimize operation of the film. As indicated above, the present technique and optically active film/layer used provide suitable configurations of scatterers or surface features for efficient light extraction to prevent loss of energy.

Generally, a majority of the light rays emitted by nanorods are subjected to total internal reflection, which means that the path length taken by most of the light rays is of order of ~1-1.5 of the length of the film L. Therefore, the concentration of scatterers may be significantly reduced since the probability of scattering is proportional to the path length multiplied by the density of scatterers' distribution within the film. Thus, for light-ray propagating inside the film along a path having length of the order of the length of the film (L) sufficient light scattering may be achieved with concentration of scatterers below 5% by volume, and more preferably below 1% by volume, and even more preferably below 0.5% by volume.

Alternatively, the concentration of the scattering particles could remain high, while using particles which exhibit a refractive index mismatch smaller than 0.07 (which as a consequence will exhibit smaller scattering probability on the single particle level). For example, for a scatterers of size of about 1 µm and medium refractive index of n=1.5, the scattering cross section using scatterers of n=1.57 is 2.8 µm². However, with the refractive index of the scatterer reduced to 1.53 ($\Delta$n=0.03, instead of $\Delta$n=0.07), the scattering cross section is reduced by factor of 5, to 0.55 µm². Thus, it should be noted that the lower the mismatch in refractive indices between the scatterers and the matrix, the scatterers concentration is higher.

Figure 5A:
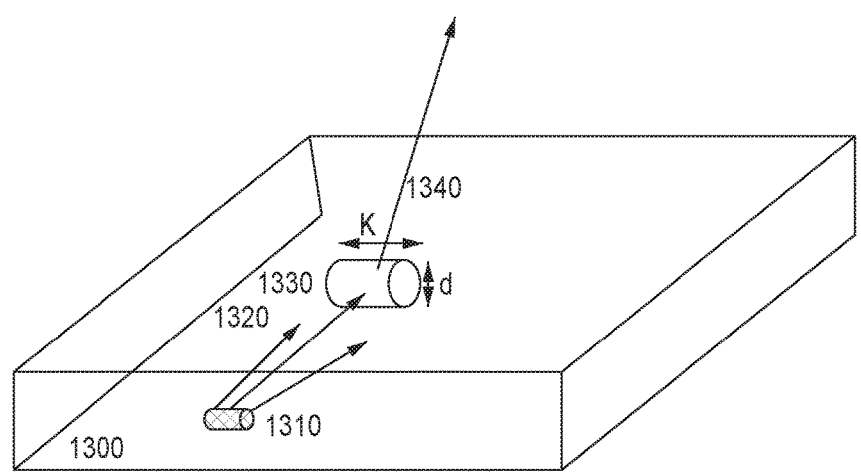
FIGS. 5A and 5B illustrate schemes of interaction of light emitted from a single nanorod embedded in the optically active structure with a larger anisotropic scatterer aligned substantially parallel to the nanorods' long axis (FIG. 5A) and perpendicular to the nanorods' long axis (FIG. 5B)
Figure 5B:
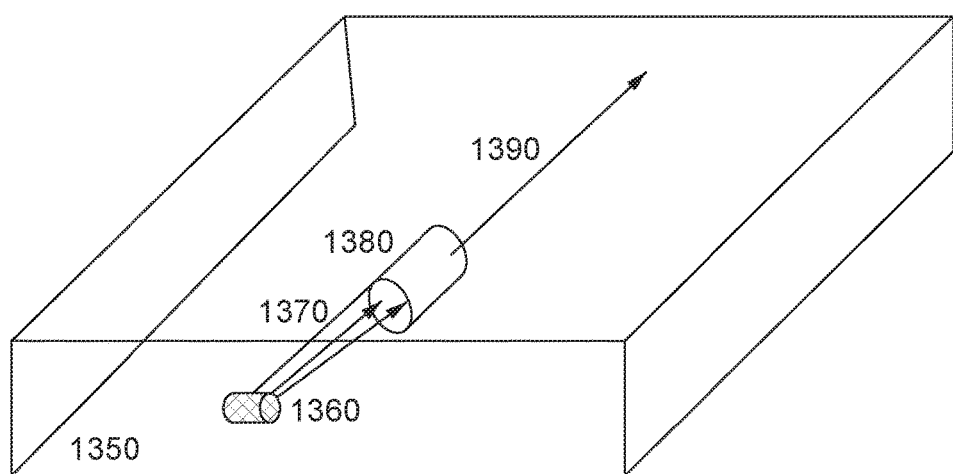

In some embodiments, the scattering particles can be much larger than the wavelength of emitted light, e.g. beyond 10 microns in size. In the configuration exemplified in FIG. 3, the nanorods and the anisotropic scatterers are aligned parallel to each other within the optically active structure. For this configuration, since the emission pattern from the nanorods is anisotropic (similar to dipole radiation pattern), the probability of scattering and interaction of the nanorods' emission light rays with the scattering particle is increased. This is exemplified in FIG. 5A illustrating interaction of light emitted from a single nanorod 1310, embedded in the optically active structure 1300, with a larger anisotropic scatterer 1330 aligned substantially parallel to the nanorod. Radiation output from the nanorods is generally dipole-like in spatial distribution. Thus, light emitted from the nanorods 1320 and propagating within the layer may have a larger probability of scattering by the scatterer 1330 due to its larger cross section in this direction (K×d). This effect is prominent for low scatterers' concentration (e.g. below 1% by volume). In the opposite case, where the nanorods and the anisotropic scatterer are oriented perpendicular to each other, is illustrated in FIG. 5B showing the interaction of emission from a single nanorod 1360 embedded in the optically active structure 1350 with a larger anisotropic scatterer 1380 which is aligned perpendicular to the nanorod. The dipole radiation 1370 from the nanorods 1360 has a smaller probability of scattering 1390 by the scatterer 1380 since its cross section is smaller ($\sim\pi(d/2)^2$)). Similarly for the 'parallel' configuration, this effect is prominent for low scatterers' concentration (e.g. below 1% by volume).

Figure 6:
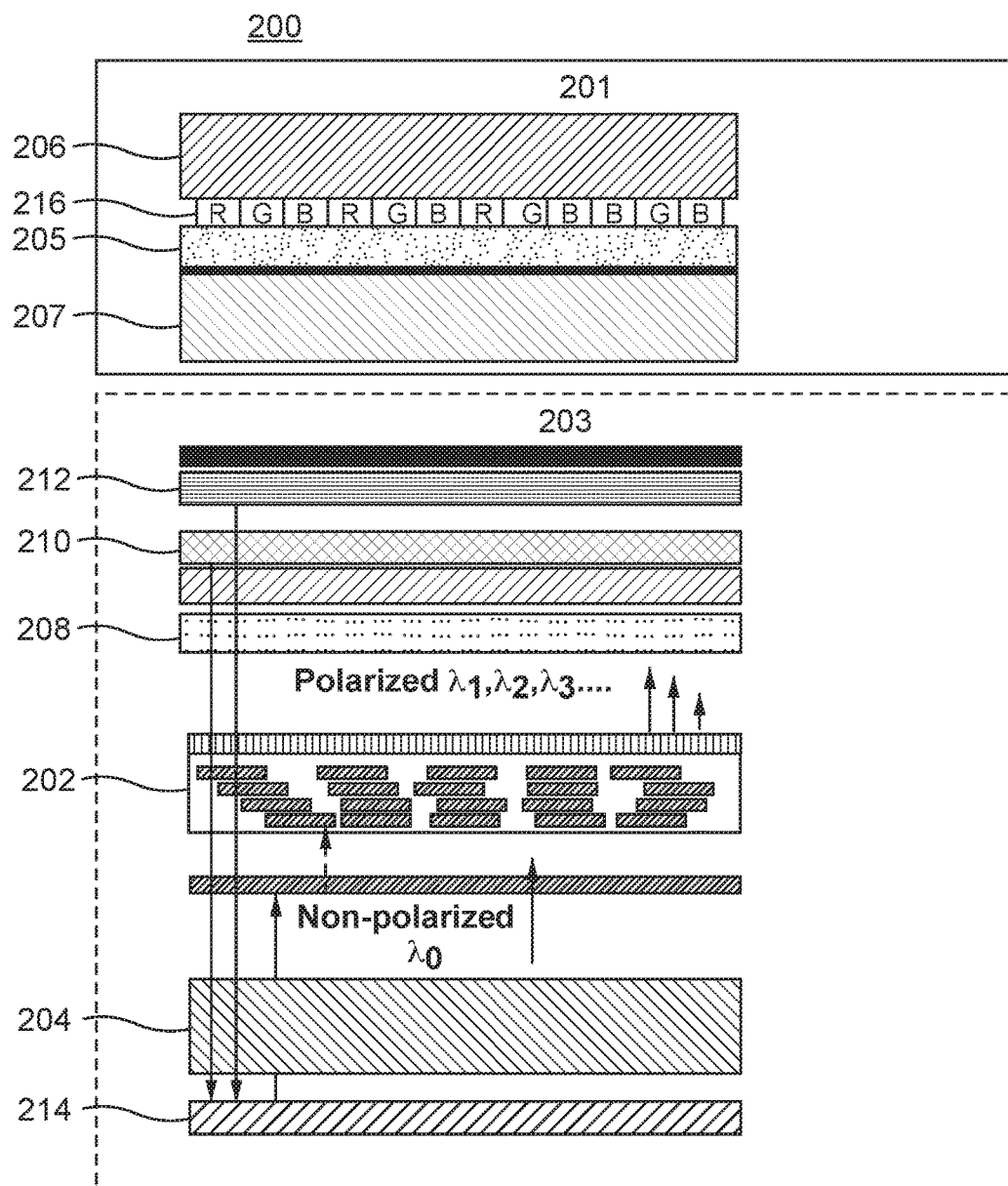
FIG. 6 illustrates an example of an LCD device utilizing the backlight unit configured according to the invention.

Reference is made to FIG. 6 illustrating an example of a display device 200. The device 200 is generally similar to that disclosed in the above-indicated publication WO 2012/059931 assigned to the assignee of the present application, and utilizes a backlight illumination unit. The backlight unit includes a pumping light source 204 and an optically active structure 202. The system 200 may generally be separated into a display section 201 (pixel arrangement) configured for providing desired spatial modulation of output light to thereby display an image to viewers, and a backlight section 203 configured to produce substantially uniform and white/polychromatic illumination. The optically active structure 202 is preferably configured for polychromatic emission at a desired color temperature. The pixel arrangement 201 may be configured as an LC panel 205, associated with polarizer 206 at the output of the LC panel. The display device 200 may also include a color filter 216. Additionally, the display device may generally also include an additional polarizer 207 located at the output of the lighting section and is generally provided to obtain a clean polarization state, i.e.

block light components of unwanted polarization state which may be generated by the nanorods due to misalignment and due to the fact the nanorods emit light at a finite polarization ratio. The display device 200 may also include a diffuser 208 which spatially homogenizes light distribution, and, may be optically attached to the optically active structure 202; a brightness enhancement film (BEF) 210, or a reflective polarizer (e.g., dual brightness enhancement film, DBEF) 212 which may be used to improve brightness by recycling the light; and may include a reflector 214 appropriately accommodated for re-circulating some of the pumping light coming from the light source and other elements.

It should be noted that the diffuser 208, BEF 210, light source 204 and reflector 212 films may or may not be attached to each other and/or to any other element of the display. It should also be noted that the diffuser 208, when optically attached to the active layer 202 may be configured for light extraction from the layer by introducing additional scattering to light components within the active layer 202 and vary the corresponding angle of propagation.

Figure 7:
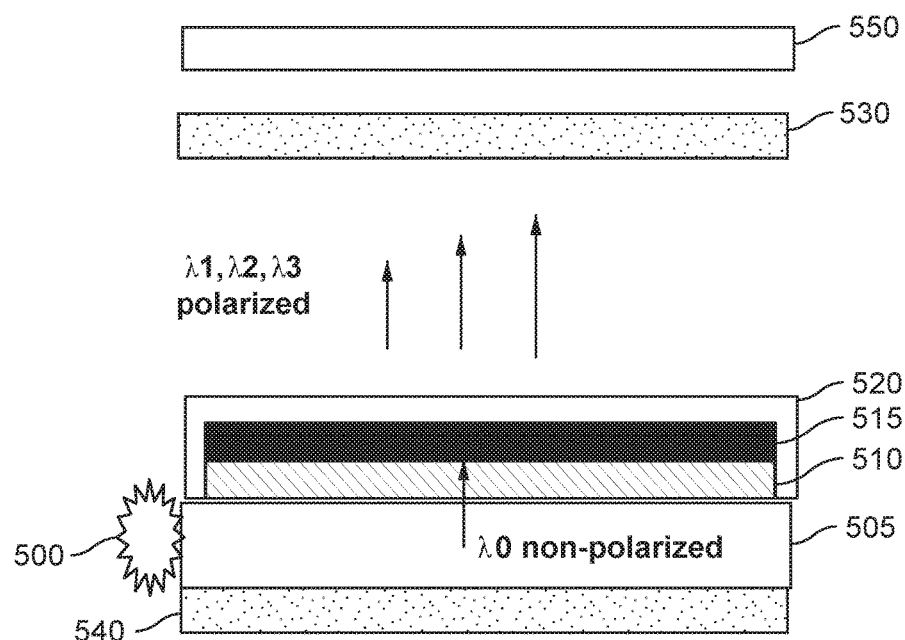
FIG. 7 shows a schematic drawing of the polarized backlight unit using nanorods films as color converters utilizing the direct attachment of the optically active structure to the lightguide.

The above-described display device utilizing emitting nanorods in a backlighting unit can be modified to increase the emission of the polarized light and improve its out-coupling from the optically active structure. In some embodiments, the optically active structure 202 is placed above a lightguide with the pumping source (e.g., Blue LEDs) being coupled to the lightguide at its edges (i.e. edge-illumination). The pumping light is out-coupled from the lightguide and impinges upon the polarized light source. In another realization, the optically active structure 202 is optically coupled/attached to the lightguide by an index-matching layer (for example an optical adhesive with refractive index of 1.4-1.5). This is exemplified in FIG. 7 showing a schematic drawing of the polarized backlight using nanorods films as color converters. As shown, a pumping source (e.g. blue LED) 500 is used as a side illuminated light source coupled into a lightguide 505. The non-polarized pumping light passes through the lightguide and propagates towards a polymer layer containing aligned nanorods (e.g. aligned by stretching) defining an optically active structure 515 through an intermediate index-matching layer 510. The nanorods layer is sealed in a barrier film 520 protecting the structure 515 from damage, e.g. moisture and oxygen damage. The layer 515 includes aligned nanorods configured to emit substantially polarized light in selected wavelength ranges, e.g. green and red light, while allowing partial transmission of the blue excitation source. It should be noted that the optically active structure 515 may be configured to also emit light in wavelength range associated with blue color, and additional selected ranges to provide desired color temperature. In such configuration the pumping light may be of blue, violet and/or UV spectra and additional one or more wavelength selective filters may be used.

Polarized light emitted by the optically active layer 515 passes through a polarization preserving diffuser 530 to improve color and brightness uniformity (intensity distribution) of the backlight before reaching the liquid crystal. Additionally, a reflective layer 540 may be placed on the rear surface of the lightguide 505 and assist in recycling of light that might be emitted backwards from the polymer layer containing aligned nanorods (e.g. aligned by stretching) 515. The emitted polarized from the backlight unit is passed onto a bottom polarizer (optionally) and then to a liquid crystal cell 550.

This configuration of the backlight unit is preferably configured to eliminate air gaps between the lightguide 505 and the optically active structure 515, enabling increased out-coupling of the pumping light from the lightguide into the optically active structure 515 (due to diminished total internal reflection). This configuration significantly increases the intensity of the excitation light within the optically active structure, resulting in significant increase in the emission from the nanorods. Additionally, the backlight unit, as well as the display part of the system, are configured to maintain polarization of light passing therealong. To this end, the selection and arrangement of the different layers, as shown in FIGS. 6 and 7, and interfaces between them is provided in accordance with polarization transmission characteristics of each layer. The layers of the display system are preferably oriented such that axis of birefringency (if exists) of the different layers is aligned with the direction of polarization of the emitted light or perpendicular to the direction of polarization of the emitted light. This is in order to eliminate, or at least significantly reduce, rotation of light polarization due to variation in optical path caused by unwanted axis of birefringency.

Figure 8:
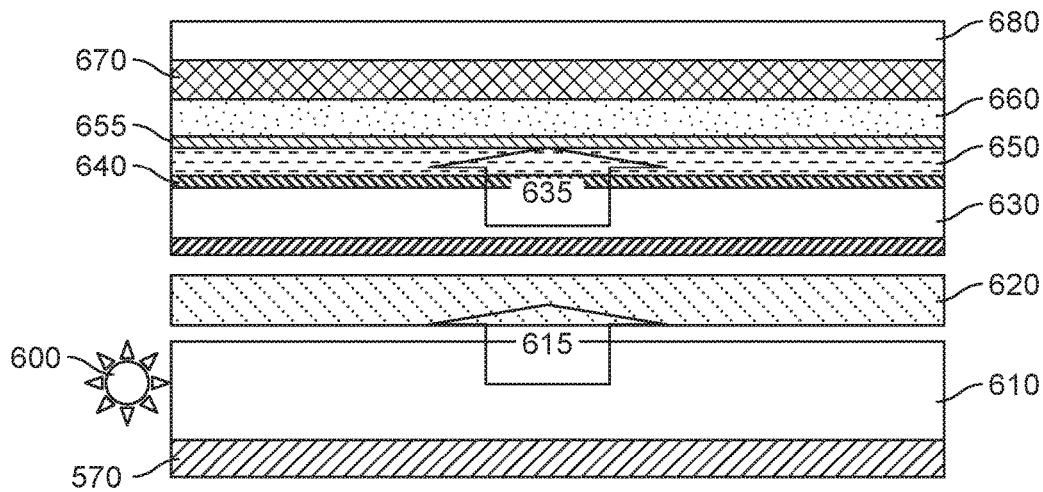
FIG. 8 exemplifies the configuration where the backlight unit of the present invention utilizes direct attachment of the optically active structure to a liquid crystal cell.

According to some other embodiments/configurations of the backlight unit of the present invention, the optically active structure is directly attached to a liquid crystal cell. This is exemplified in FIG. 8 illustrating an optical stack for use in a display device. In this example, a pumping light source (e.g. blue LED) 600 is used as a side illuminated light source optically coupled into a lightguide 610 for transmitting the pumping light towards the optically active structure/film. Non-polarized pumping light 615 passes through the lightguide 610 and propagates towards a polarization preserving diffuser film 620, which may be located between the lightguide and the optically active film 630 to improve the uniformity of the pumping light. This is to optimize intensity distribution of the pumping light and therefore also of the emitted light. In this example, an optically active structure includes aligned nanorods layer 630 that is sealed in a barrier film 640, which protects it from moisture and oxygen damage. The pumping light 615 excites the nanorods layer 630 which emits polarized light 635 of one or more wavelength ranges, typically different from the pumping light, (e.g. green and red light). Generally, a portion of the pumping light 615 may be transmitted through the optically active layer 630 and may be used as output of the illumination unit. Alternatively, the transmitted portion of the pumping light may be blocked by a wavelength selective filter layer, e.g. in the case of UV pumping light. The barrier film 640 is attached directly to a bottom polarizer 655 and liquid crystal cell 660 by an index-matching attachment layer 650. Additional color filter layer 670 may be located upstream or downstream of the liquid crystal layer 660. The color filter layer 670 includes array of wavelength selective filters aligned with pixels of the liquid crystal layer 660 to enable color variations between different pixels of the display. Also, some configurations of the optical stack may utilize an additional diffusive layer 680 located downstream of the liquid crystal layer 660, but may be upstream or downstream of the color filter layer 670 (when used). The additional diffusive layer 680 is generally used to improve display quality by providing uniform illumination of each pixel of the device. Backward light recycling may be provided by a reflective layer 570 that may be placed on the rear surface of the lightguide 610 to redirect light emitted backwards from the optically active layer 630. Thus the reflective layer 570 increases efficiency of illumination by preventing, or at least reducing, losses caused by light components propagating in a backward direction.

Thus, in this case, the pumping light 615 (e.g. blue light) is directed by the lightguide 610 and passes through the polarization preserving diffuser film 620 to improve the light uniformity and deflect the light output from the lightguide in the forward direction. The polarized white light 635 from the polarized light source 630 passes through the index-matching layer 650 directly into the bottom polarizer 655 of the liquid crystal 660 cell. The reflective layer 570 is preferably placed in the rear of the lightguide 610 in order to recycle light emitted backwards from the nanorods layer 630.

It should be noted that all the above-exemplified configurations and techniques are generally aimed at effectively extracting polarized emitted light from the light emitting structure/layer and directing the emitted light to propagate in a desired direction (towards a viewer). The technique of the invention can similarly be used with a light emitting optically active structure, regardless of relative locations of the optically active layer with respect to a lightguide, if any. It should be noted that the pumping light may be directed at the optically active layer through propagation within a dedicated lightguide as well as by free propagation of light. Additionally, the optically active film may generally be located at the edge of a lightguide, when used, or on top of a lightguide.

a lightguide for the pumping light, while being configured for scattering of the emitted light to thereby reduce trapping thereof and provide efficient illumination in the desired wavelength ranges. Thus, according to some embodiments of the present invention polarized backlight can also be obtained by side-lit illumination architecture, for example, by placing a polymer layer containing aligned nanorods (e.g. aligned by stretching) in proximity to a pumping light source (edge-lit), between the pumping source and the lightguide edge, as described in the earlier patent publication of the same assignee, WO 2012/059931.

Figure 9:
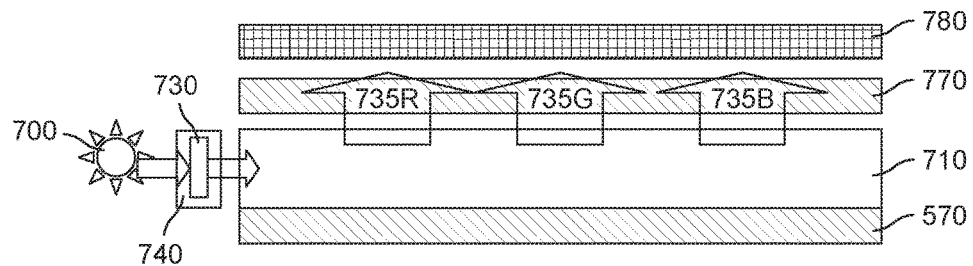
FIG. 9 shows schematically a polarized backlight unit of the invention where a nanorods-containing strip is placed on the edge of a lightguide.

This configuration is exemplified in FIG. 9, showing schematically such a polarized backlight unit using a nanorods-containing strip 730 (with aligned nanorods) placed on the edge of a lightguide 710. A pumping light source 700 is used as an edge-illuminating light source. Pumping light from the light source 700 impinges on the strip 730 (acting as optically active layer/film) and excites the nanorods to emit light of one or more predetermined wavelength ranges. The nanorods-containing strip 730 is located between the pumping light source 700 and a lightguide 710 and is configured such that light emitted by the nanorods in the strip 730 is output from the strip to be coupled into the lightguide 710. The nanorods film 730 is preferably sealed in a transparent barrier medium (glass or polymer based) 740 configured to protect it from damage, e.g. oxygen and/or water or additional materials.

The polarized light from the nanorods strip is coupled into the lightguide 710 and propagates within the waveguide to be out coupled towards the optical stack. The emitted polarized light may be out-coupled utilizing a grating or grating-like pattern created on the waveguide, scatterers located within the waveguide, as described above with reference to FIGS. 2 and 3, and/or by a polarization preserving diffuser 780 attached to the waveguide. Such polarization preserving diffuser 780 may anyway be used to improve color and brightness uniformity of the backlight before reaching a bottom polarizer (optional) of a liquid crystal cell 770. Similarly to the example of FIG. 8, a reflective layer 570 is preferably placed on the rear surface of the lightguide 710 to recycle light. As shown, the lightguide 710 may preferably direct and out couple emitted light, and in some cases a portion of the pumping light, at one or more wavelength ranges, three such wavelength ranges are exemplified in the figure as 735R, 735G and 735B.

In some configurations, the nanorods-containing strip 730 may be optically bonded to an edge of the lightguide 710 to improve coupling of light. This may be provided utilizing an index matched adhesive (for example an optical adhesive with suitable refractive index), as well as utilizing suitable optical assembly and also by proper design of the contact point. Generally, the strip 730 is placed on the lightguide with the alignment axis perpendicular to the lightguide edge, or more preferably with the alignment axis parallel to the lightguide edge.

The degree of polarization of the light output from the lightguide 710 can be improved by using a lightguide made of non-birefringent polymer blends other than the standard injection-molded PMMA lightguide. Such efficient polarization maintaining lightguide was exemplified by Prof. Koike [optical reviews, Vol 19(6), 415-418 (2012)]. Other techniques for achieving non-birefringent lightguides may be used involving processing methods that do not cause orientation in the polymer chains, for example, casting or extrusion molding of the polymer at a slow speed or biaxial stretching.

In some other configurations, polarized light with narrow angular distribution can be obtained utilizing a light control film as described for example in U.S. Pat. No. 6,746,130, which is incorporated herein by reference with respect to this not-limiting example. More specifically, light from a polarized light source strip is coupled into a lightguide designed to out-couple most of the light at large angles instead of out-coupling of light in the forward direction. A specially designed reverse prism sheet is placed above the lightguide attached to the output face thereof. The reverse prism sheet efficiently re-directs the light output from the lightguide and deflects light propagation path to transmit the light in the forward direction towards the LC cell. According to the present technique, however, the reverse prism sheet may preferably be based on a non-birefringent polymer substrate.

As indicated above, according to some embodiments of the invention, the optically active structure, as well as the entire polarized light source unit, may be configured as a film stack. In this connection, the following should be noted. Typically, light from the polarized light source may pass through a polarization preserving diffuser to improve the color uniformity and brightness uniformity of the emitted polarized light output from the backlight unit. Common backlight diffusers which include scattering particles (such as titanium oxide, barium sulfate, acrylic beads or air voids) embedded in a polyethylene terephthalate (PET) film. Such highly diffusive films induce light scattering that completely depolarizes light passing therethrough. Therefore, to provide a polarization maintaining stack, the backlight unit may require the use of polarization preserving diffusers in order to maintain polarization of emitted light. To this end, the optical stack may preferably utilize surface type diffusers. Such surface type diffusers are to be carefully designed based on surface structures, such as micro-lenses or other surface features inducing surface roughness to cause scattering of light passing through, while eliminating, or at least significantly reducing, polarization rotation and loss due to light scattering. Preferably, the diffuser layer is based on a birefringence-free, or a low-birefringence, polymer substrate carrying the surface scattering features. Such polymer substrate may be formed of one or more of the following:

polyacrylates (for example PMMA), polycarbonate (PC), cyclic-olefin copolymer (COP) or triacetate cellulose (TAC).

In a typical configuration, the polarized light source (including the optically active structure) is placed on top of a lightguide configured for directing light from a pumping light source to the optically active layer. Generally the pumping light is coupled to the lightguide at one or more of its edges (i.e. edge-illumination) and is out coupled from a top face of the lightguide to impinge upon the optically active structure. Additional optical films, such as prism films, brightness enhancement film (BEF) or reflective polarizers (such a dual brightness enhancement film (DBEF)), may be used for efficient light recycling and brightness enhancement, and are located on top of the optically active structure/film or upstream.

The optically active structure contains suitable nanorods that typically emit light in both the forward and backward direction in response to the pumping light, and generally in various additional directions. Therefore, a highly reflective layer is preferably placed in the back surface of the lightguide in order to recycle light emitted backwards, and returns it towards the lightguide. Such a reflective film is preferably configured with reflectance above 95% and more preferably above 98%. The reflective film may also include highly diffusive sheets containing scattering beads (acryl, titanium oxide or barium sulfate). Alternatively, the reflective film may be configured as a multi-layer sheet acting as a specular reflector (e.g. ESR film commercially available from 3M). Generally, the reflective film/layer may be of any reflector type. It should however, be noted that the reflective film may preferably be based on one or more metal layers (for example, silver or aluminum) coated on a substrate (e.g. polymer, plastic).

Generally, the following should be noted in connection to light redirecting (e.g. reflecting, guiding, scattering) optical elements configured for preserving polarization properties of light as described above. Polymer films, generally used for optical stacks, may or may not be configured with certain level of birefringent properties. Part of the birefringence is typically an inherent characteristic of the polymer, while suitable manufacturing processes may provide for increasing and/or decreasing birefringence properties. More specifically, some polymers suitable for use in optical redirecting, e.g. polyethylene terephthalate, PET, have substantial birefringence properties. Typical polymer manipulations may vary a direction of the principle axes and/or level of birefringence. For example, stretching of the polymer may change the refractive index for light polarized parallel or perpendicular to the stretching direction.

The following are some known examples of light redirecting optical elements (LROE's) suitable for use in the optical stack of a display device or backlighting unit according to the present invention: Brightness Enhancing Films (BEF), which often have prisms shapes on one surface (by which the BEF is facing an LC layer) of the film that redirects light to the desired direction normal to the film and also use light recycling to produce this result; Reverse Prism Films (RPF) that have prisms facing a lightguide and are used with specially designed lightguides; diffuser films with surface or volumetric features configured for redirecting light, for example the Light Shaping Diffusers (LSD®, commercially available from Luminit) or Tailored microdiffusers (TMD®, available from WaveFront Technologies); lightguides that redirect light usually entering at an edge and redirecting it in the direction normal to the surface of the lightguide. It should be noted that the term LROE, or light redirecting optical elements as used herein should be interpreted broadly referring to any optical element that may be used in an optical stack and is configured to vary light propagation therethrough. As indicated above such variation may include reflection, refraction and diffusing of light as well as absorption and re-emission of light components.

It should however be noted that generally LROE's, or any other layer of the optical stack, having birefringent properties might cause variation in polarization of light passing therethrough. More specifically, if the birefringent properties of LROE's are not homogenous with respect to orientation of the principle axes relative to the direction of polarization of emitted light. It should be noted that in the conventional, commercially available, LC-based display devices, homogeneous birefringency of the layers are of low importance as the backlight in not specifically polarized, but rather being polarized using one or more polarizers. Thus, a general existing LROE assembly is typically not suitable for use in polarization maintaining film stacks for the purposes of the present invention, since the polarization state and/or orientation of light passing through layers thereof may be changed.

Figure 10A:
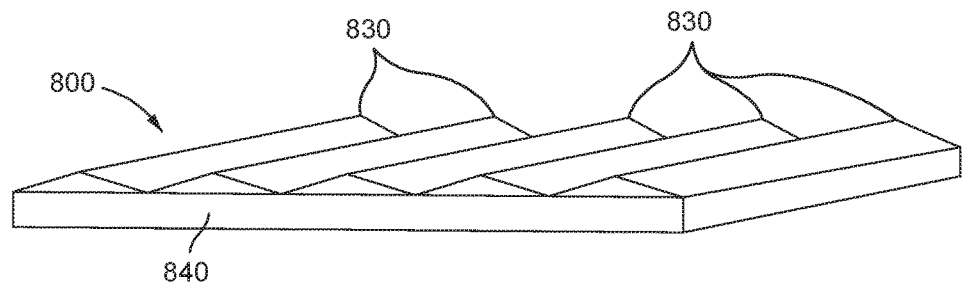
FIGS. 10A and 10B illustrate examples of a BEF suitable for use in the present invention.
Figure 10B:
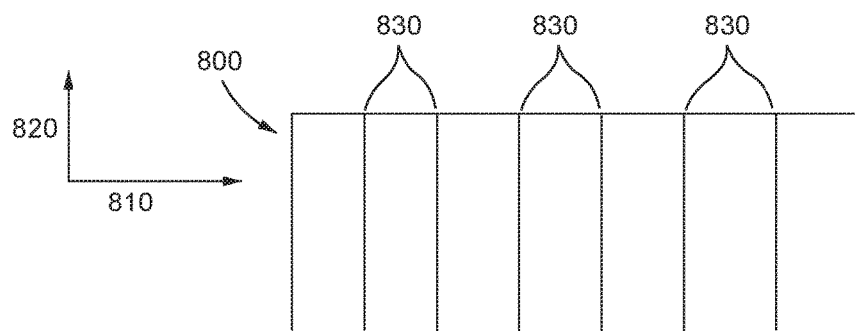

The present invention provides a novel configuration of a light redirecting structure utilizing a specially designed optical element configured to redirect light by refraction of suitable selected refractive features. Such refractive features may for example be associated with surface geometry of the optical elements, as well as suitable scattering particles (in case of diffusive elements). An appropriately configured optical element is capable of redirecting light incident thereon with respect to an angular range of light propagation. For example, the optical elements may be configured for redirecting input light having a large angle of incidence, to output light with a smaller angular range. This effect may be used to increase the light intensity directed to a smaller viewing angle, so the image can be viewed by the user whose line of sight to the display venter is perpendicular. Alternatively, the opposite variation may be used to provide wider angular options for viewers. As indicated, such optical element may be configured utilizing proper surface geometry/shape variation of a LROE film. Such light redirecting optical element is exemplified in FIGS. 10A-10B, showing a birefringent redirecting film 800 having predetermined surface features to polarization preserving light redirecting. Such film may for example be configured as a brightness enhancement film (BEF). FIG. 10A is a schematic illustration of a birefringence re-directing film 800, e.g. configured as BEF. The redirecting film 800 is configured with a plurality of prism (or prism-like) features 830 on a support layer 840. The surface features 830 extend along a predetermined axis selected to be parallel or perpendicular to the optic axis (birefringent optical axis) of the support layer 840. FIG. 10B shows a top view of the light re-directing film 800 carrying the surface features (vertical lines correspond to the tip of the prism) 830. Also illustrated in FIG. 10B are the directions of the fast 810 and slow 820 axes of the redirecting film 800, which mark the directions of the two principal axes of layer 840.

Specifically, it should be noted that the surface features 830 are preferably configured to extend along a predetermined axis such that the predetermined axis is parallel to one of the principal axes of layer 840 of the redirecting film 800, i.e. to the fast 810 or slow 820 axes. In cased where the material of the surface features has non negligible birefringence, the surface features 830 are preferably configured such that the predetermined axis of the features is also aligned with fast/slow axes of the surface features material/layer. It should be noted that although FIG. 10B shows the surface features 830 extending parallel to the slow axis 820 of the redirecting film 800, similar effect is generally obtained with the surface features 830 extending parallel to the fast axis 810.

Various designs of the prisms 830 angles, width and height, as well as other parts of the LROE 800, may be used to provide the desired re-direction of light. It should be noted that the surface features 830 may be configured as prisms or prism-like features, e.g. "modified prisms" having a curved tip replacing the conventional prism sharp tip, or any other type of features providing desired light re-directing. It should also be noted that the optical element of the invention is configured such that surface features thereof are aligned with predetermined angular relation in respect to the slow and fast axes of birefringency of the supporting layer 840. Generally, LROE film of the invention may be configured with one or more of the following properties:

The LROE film may be configured with "Zero-Zero" birefringence properties, i.e. the film material is prepared with no birefringence or with similar refractive indices for the slow and fast axes (e.g. as described in Koike et al [12]).

The LROE film may be configured from low level birefringence materials, such as TAC (triacetate cellulose) (e.g. as described in [14]). Additional low birefringence polymers may include cyclic olefin copolymers (COP), polymethyl methacrylate (PMMA) or polycarbonate (PC).

The LROE film may be made from a film having differential retardation properties for light with different polarization along the fast and slow axes (e.g. 810 and 820 in FIGS. 10A, 10B). The birefringent properties are homogenous across the entire film. In particular, the film is aligned such that the preferred axes of birefringence are along the direction of the elongated feature's long axis or perpendicular to this axis.

Figure 11:
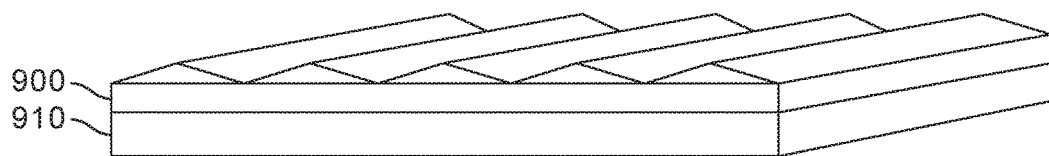
FIG. 11 exemplifies a Light Re-directing Optic Elements (LROE) suitable for use in the invention, where an external layer with birefringent properties is used that compensates the LROE birefringence for light passing through the combination of the two films.

It should be noted that the LROE may have any one of the above described configurations. Additionally, the LROE may also be configured utilizing an added separate film selected and aligned to compensate for imbalance/angular variations in the birefringence axes alignment. Generally, such compensation film is configured and aligned to balance the retardation induced by the LROE film with respect to optical path of light component polarized along the fast and slow axes of the LROE film (light of the ordinary and extra-ordinary polarization states). This is exemplified in FIG. 11, showing an LROE film 900 carrying a surface pattern and placed on top of an external layer 910 configured for balancing optical path of light of selected polarization states. The compensation film 910 is configured with birefringent properties preselected to compensate the LROE birefringence for light passing through the combination of the two films. To this end, the film 910 is selected such that when it is used in combination with (i.e. is stacked with) the LROE 900, the dual-film combination provides zero, or close to zero birefringence, or birefringence that is oriented with parallel or perpendicular alignment with the nanorod direction.

It should also be noted that, although the invention is exemplified with respect to light re-directing film, suitable birefringency alignment as well as the use of compensation film as described above might be preferred for various films/layers in an optical stack according to the present invention. It should also be noted that in order to provide energetically efficient display system (i.e. high brightness of display utilizing minimal energy), the optical stack is be configured to preserve polarization of light passing therethrough. More specifically, the different layers/films of the optical stack, including the optically active layer, lightguide, LC panel arrangement, diffusive films etc., are preferably configured to maintain polarization by proper selection of birefringence properties and alignment of the fast/slow axes with respect to axis of alignment of the light emitting nanorods. As indicated above, this may be achieved using the above described "zero-zero", low birefringence and compensation film, separately, or in any combination thereof. Additionally, it should be noted that in some embodiments, different layers of the optical stack may be configured to act as a compensation film for other layers of the stack.

Thus, generally the light redirecting optical element, or any other layer of the optical stack (optically active film, lightguide, diffuser etc) according to some embodiments of the invention may actually be configured as a Selective Birefringent LROE (SBLROE), namely, such films/elements do not depolarize light passing through (interacting with it) and do not rotate polarization of light. Such polarization maintaining properties are provided by proper alignment of the slow or fast axes of the SBLROE with respect to polarization direction of the electric field or magnetic field vectors. Thus, as the polarization axis of light is parallel to the fast/slow axis of the SBLROE, the polarization direction is substantially not rotated, or is only partially rotated. The SBLROE optical stack of the invention can advantageously be used in an LCD backlight module's optical stack.

Figure 12:
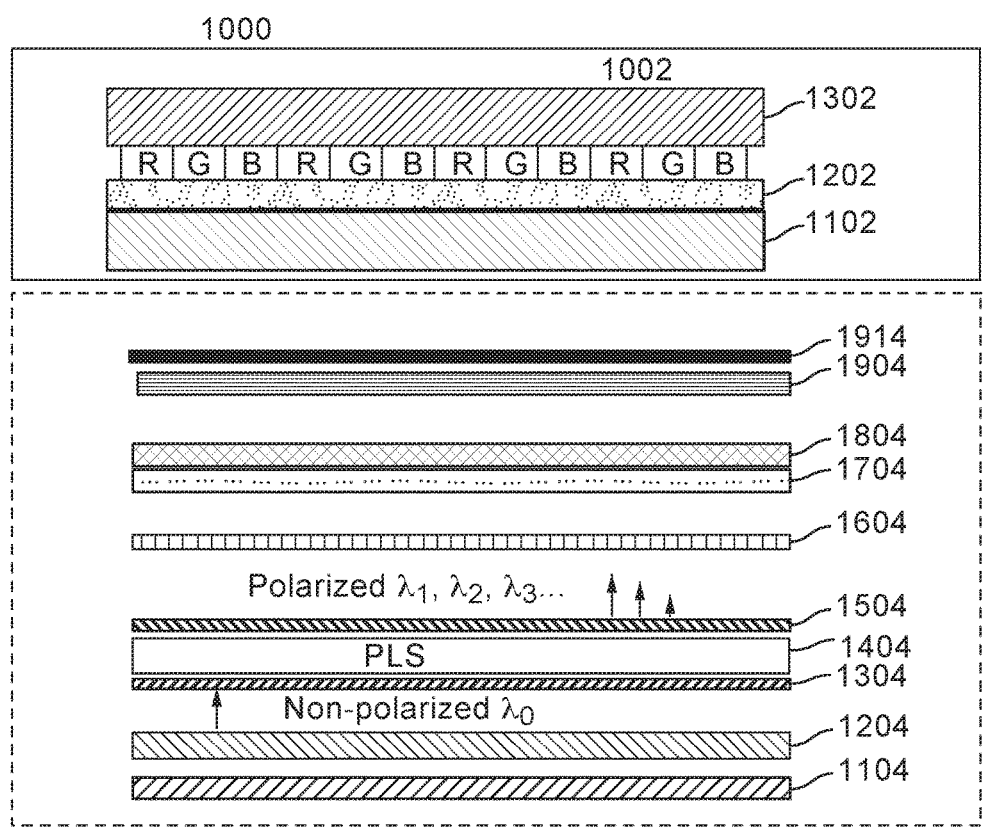
FIG. 12 illustrates schematically an LCD device having an active light modulation module and a backlight unit of the invention.

In this connection, reference is made to FIG. 12 illustrating an LCD device 1000 having an active light modulation module 1002 and a backlight unit 1004. The LCD device 1000 is configured as a layered stack including a reflective mirror 1104, a light source 1204 (e.g. including a lightguide as described above) and a polarized light source film 1404 (optically active structure). The backlight unit 1004 may also include one or more diffusive layers located upstream 1604, or downstream 1304 of the optically active layer 1404. Additionally, the backlight unit may include one or more brightness enhancement films (e.g. 1704 and 1804), reflective polarizer (e.g. dual brightness enhancement film DBEF, 1904) as well as one or more wavelength selective filters 1914 for filtering out light of undesired wavelength (e.g. pumping light). As also described above, the optically active layer 1404 may be attached to a light extraction layer 1504 configured to enhance out-coupling of light from the active layer 1404. Generally, each of the layers of the backlighting unit 1004 is configured to preserve polarization of light passing therethrough as described above. In this connection the following elements of the display device 1000 are generally considered as elements of the class LROE: reflector 1104, lightguide 1204, diffusers 1304 and 1604, light extraction layer 1504, BEF films 1704 and 1804.

It should be noted, although not specifically shown, that the backlight unit 1004 may also include one or more barrier films configured to provide suitable protection to selected layers, e.g. the optically active layer 1404, light source 1204, etc.

It should also be noted that, in some embodiments, the backlight unit 1004 may include two or more LROE's arranged in a cascade fashion, i.e. one LROE placed on top of another LROE. Such cascaded LROE arrangement may be used to further redirect light, e.g. to provide wider angular distribution with respect to what can be provided by a single layer LROE. It should be noted, and also described above, that each LROE is preferably configured with either zero- or low-birefringence properties (i.e. induced reduced retardation to light passing therethrough), and/or have its birefringent optical axis either parallel or perpendicular to that of the other LROE and to the polarization direction of the emitted light (alignment axis of the nanorods).

Further, as also indicated above, such zero- or low-birefringence, as well as proper alignment of the fast/slow axes in case birefringency is an unavoidable property, is generally preferable with respect to additional elements/layer of the backlight unit 1004 to provide efficient illumination and prevent losses. For example, one or more BEF elements used in the backlight unit 1004 to enhance brightness in one or more selected wavelength ranges are also preferably configured to preserve polarization of emitted light. The optically active structure 1404, being configured as nanorods embedded in a matrix or deposited on a substrate is preferably configured such that the principal axes of the matrix/substrate and barrier layers when used, are aligned with the axis of alignment of the nanorods.

It should be understood that similar alignment with respect to birefringence properties may be used in other devices employing illumination with polarization properties as mentioned above, including back illumination and side illumination. In some embodiments, SBLROE used in the unit/device may be in the form of a lightguide configured to receive polarized light arriving from a predetermined direction and emit it in a predetermined (different) direction. Additional SBLROE of different forms may be placed on top of the lightguide to provide additional redirecting properties, such as diffusion and brightness enhancement.

Thus, the optical stack of the invention, as well as selected films/layers thereof (e.g. SBLROE, diffusive layer, optically active layer, wavelength filter, etc.), are configured to maintain polarization of light passing therethrough by eliminating, or at least significantly reducing birefringence properties, and/or maintain alignment of the fast/slow axes of birefringency with respect to polarization direction of emitted light. Such optical elements and a stack thereof may be used with, or as part of, a polarized light source in various applications requiring polarized illumination and maintenance of desired polarization direction of output light as well as to increase the light output directionality.

As described above, the optically active structure, backlight illumination unit, as well as the corresponding optical stack, is preferably configured such that all or some of the optical components thereof have no-, or at least reduced, birefringence properties (i.e. induce minimal retardation). Additionally or alternatively, the optically active structure and additional layers are preferably oriented such that a principal axis thereof (i.e. fast or slow axis) is parallel to the direction of polarization of the emitted light. It should also be noted that films/layers having low- or no-optical activity, such as encapsulation film and barrier film (e.g. elements 520 and 640 in FIGS. 5 and 6), configured to provide suitable protection to selected elements (e.g. nanorods or optically active layer barrier), are preferably also configured to maintain polarization by eliminating/reducing birefringence properties or at least by proper alignment of the fast/slow axes appropriately.

The following is description of the experimental realization of selected embodiments of the invention, as conducted by the inventors.

Example 1

In order to construct a backlight unit, aligned nanorods film was placed on the surface of a lightguide plate (slab) coupled to a pumping light source in the form of a blue emitting LED bar (central wavelength 450 nm FWHM=20 nm, edge-lit). A highly reflective sheet based on Silver layer coating was placed in the back surface of the lightguide in order to recycle the light emitted backwards.

The polarized light output from the nanorods layer was directed to pass through a polarization maintaining diffuser (in this non-limiting example LSD™ holographic diffuser, circular 30 degrees, available from Luminit was used) to improve brightness uniformity.

As a light redirecting film, a Reflexite collimating film (RCF™) commercially available from Orafol Europe GmbH was used. A specific batch had the desired birefringence alignment axes that are along the facet of the light redirecting films' prism. This film was placed parallel to the nanorods alignment axis or in a perpendicular alignment. In both alignments, the polarized nature from the nanorods film was partially maintained (a polarization ratio of 1.6 was achieved). The polarization ratio is a figure of merit for the polarization performance of a film, and is measured by placing a polarizer in front of the film in parallel to the rods alignment axis and perpendicular thereto. The ratio between the two intensities is the polarization ratio. The present example shows "partial preserving" of the polarization since the polarization ratio changed from 3 to 1.6. The SBLROE film provided an increase of 56% for the blue light with desired polarization and an increase of 46% for the red component with desired polarization.

Figure 13:
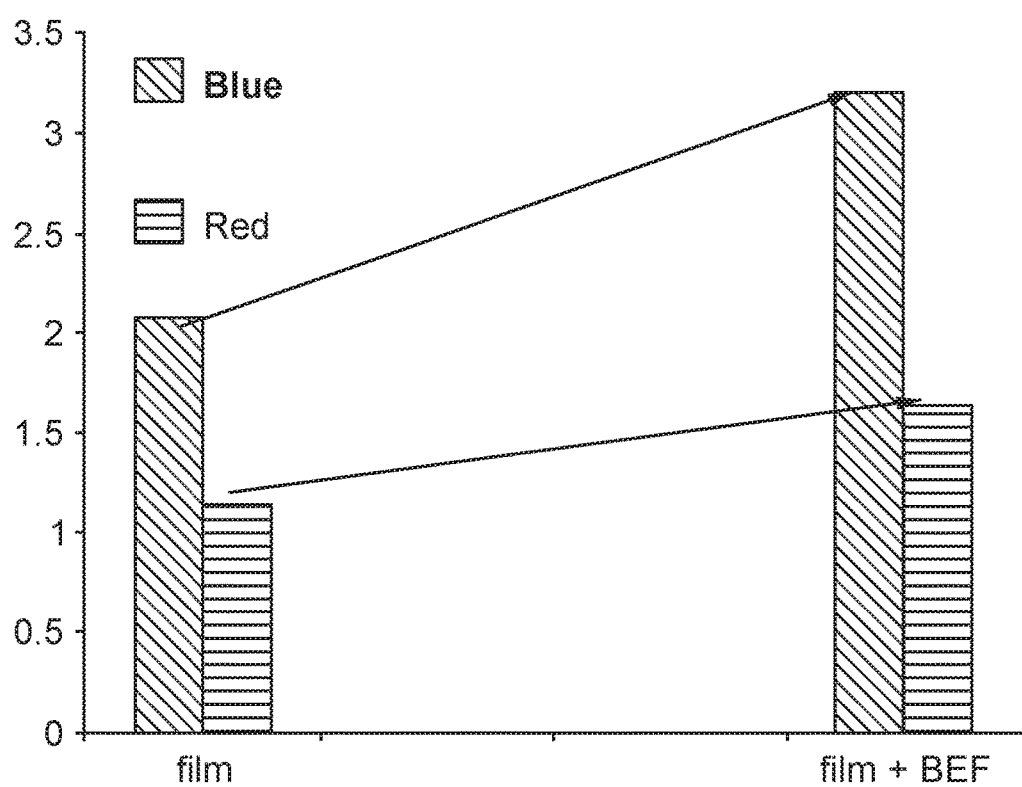
FIG. 13 shows experimental results of emitted light intensity for an example of a polarized light source with aligned red-emitting nanorods, wherein the intensity of blue pumping light transmitted by the polarized light source and red light emitted by the aligned nanorods were measured, with a polarizer's preferred plane of polarization being aligned parallel to the nanorods for the case of nanorod containing layer only (left side in the figure), and for the case of using a special BEF with birefringence axis aligned with the nanorods' alignment axis in front of the nanorod containing layer (right side of the figure)

This is illustrated in FIG. 13 showing experimental results for the improved light emitted to the front direction of a waveguide obtained by using the SBLROE, demonstrated for a single color (red) film. These results correspond to the experiment with the light from the backlight passing through a polarizer with its transfer axis parallel to the main polarization axis of the optically active film. This is done in order to obtain more full polarization properties for the light. It should be noted that although the polarization ratio value of 3 was not maintained, the polarization ratio level of 1.6 provided additional 23% of light compared to that of using a BEF that completely depolarizes the light (with polarization ratio equal to 1).

Example 2

In order to construct a backlight unit, the aligned nanorods film was placed on the surface of a lightguide plate (slab) coupled to a blue emitting LED bar (central wavelength 450 nm FWHM=20 nm, edge-lit). A highly reflective sheet based on Silver layer coating ("BL film", commercially available from Oike) was placed in the back surface of the lightguide in order to recycle the light emitted backwards.

Figure 14:
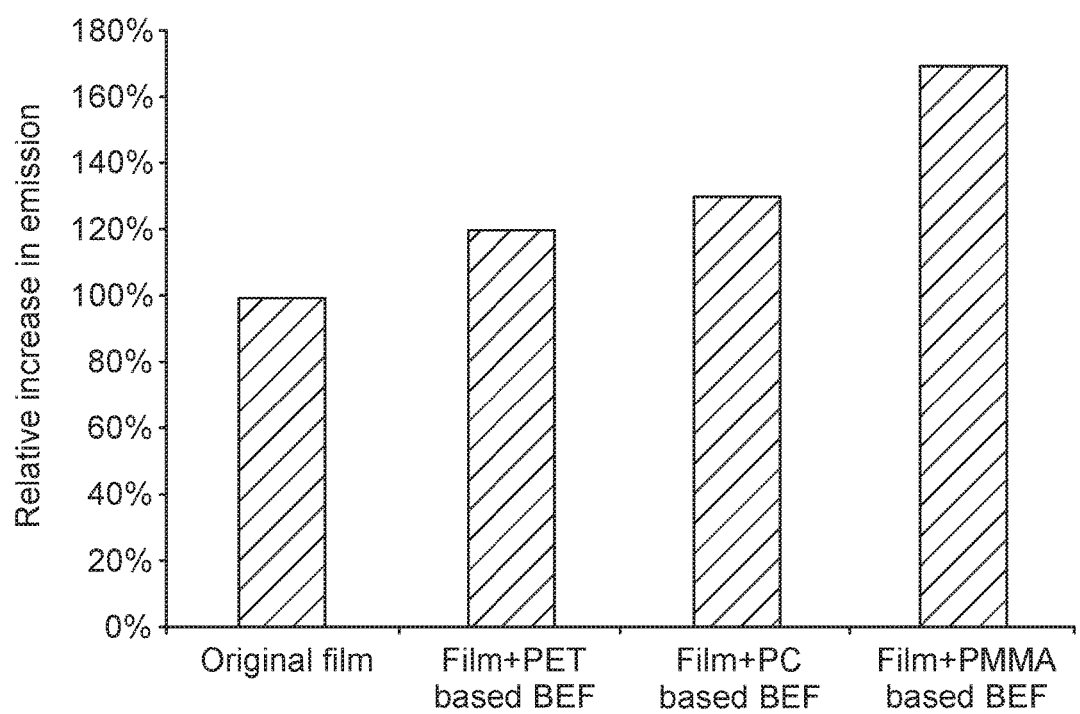
FIG. 14 shows experimental results of emitted light intensity for an example of a polarized light source utilizing a mixture of aligned red-emitting and green-emitting nanorods, where the sum intensity for Red and Green light was measured for the case with a polarizer's preferred plane of polarization being aligned parallel to the nanorods' alignment axis, and a BEF film composed of different polymer materials: PET, PC and PMMA.

As a light redirecting film, a prism film with 160 um pitch and prisms with angle 90 degrees was used. A specific film with a non-birefringent polymethyl-methacrylate (PMMA) substrate was chosen (250 micron substrate with retardation below 25 nm). This film was placed parallel to the nanorods alignment axis or in a perpendicular alignment. In both alignments, the polarization ratio received was 2. The LROE film provided an increase of 60-80% for the green and red light compared to 10-40% increase obtained using prism films which are based on birefringent polymer substrates. The comparison is shown in FIG. 14. This figure shows the effect of the LROE substrate on the efficiency of polarized light extraction. The experimental results show the improved light emission (the sum of red and green emitted light components compared with this sum for the film's emission without BEF; in the figure, the y-axis is in percent % units) parallel to the alignment axis of the nanorods and to the front direction of a waveguide obtained by an LROE (prism film) with exactly the same prism structure and different polymer material as a substrate. The LROE based on non-birefringent PMMA substrate exhibits improved efficiency compared to polycarbonate (PC) and polyethyleneterephtalate (PET) substrates which exhibit birefringence. It should be noted that all BEF films used herein have the exact same prisms structure.

Thus, the present invention, as described above, provides for a novel polarized light source based on polarized emission of an optically active structure including aligned emitting nanorods and utilizes proper arrangement of optical elements in the path of emitted light. The polarized light source of the invention is configured to maximize the emission of desirably polarized light and its out-coupling from the optically active structure with maintained polarization state.

The invention claimed is:

1. A polarized light source comprising:
   at least one optically active structure comprising a plurality of nanorods configured to emit light of one or more wavelengths in response to exciting pumping field, said plurality of nanorods comprising nanorods aligned with a predetermined alignment axis so as to produce a desired polarization direction of the emitted light;
   wherein said optically active structure comprises a host matrix, said plurality of nanorods being embedded in said host matrix, and wherein said optically active structure is configured to enhance the output of the light emitted from the nanorods while substantially maintaining the polarization characteristics of the emitted light;
   wherein the optically active structure further comprises a plurality of scattering particles mixed with said plurality of nanorods and being embedded in said host matrix, said scattering particles having different birefringence properties with respect to said host material;
   wherein either: a) the host matrix is formed of an isotropic material composition having zero or relatively low birefringence properties of said host matrix, and said scattering particles are configured with predetermined non-zero birefringence properties, or b) the scattering particles have zero or relatively low birefringence as compared to a difference between fast and slow axes birefringence of a material composition of the host matrix;
   wherein said scattering particles are configured to provide refractive index matching for light components having polarization orientation perpendicular to said alignment axis while providing mismatch in refractive index for light components polarized along said alignment axis;
   and
   a light directing assembly comprising one or more redirecting optical elements in an optical path of light emitted from the light emitting structure, each of said one or more redirecting optical elements being configured to affect direction of propagation of a light component interacting with said redirecting optical element while substantially not affecting polarization of said light component, said light directing assembly being thereby configured to enhance output of the emitted light from the emitting structure by optimizing polarization and intensity distribution of output light, wherein said one or more light redirecting optical elements comprise at least one of the following: a light recycling optical element, a reflective layer or a diffusive layer.

2. A polarized light source according to claim 1, wherein said one or more light redirecting elements comprise light redirecting elements being aligned with respect to alignment axis of the plurality of nanorods such that a principal birefringence axis thereof is substantially parallel or substantially perpendicular to the alignment axis of the emitting nanorods, thereby preserving the polarization characteristics of emitted light passing through the one or more light redirecting optical elements.

3. A polarized light source according to claim 1, wherein said one or more light redirecting elements comprise at least one light redirecting element configured with low birefringence, defining a retardation factor substantially not exceeding 100 nm thereby preserving the polarization characteristics of the emitted light.

4. A polarized light source according to claim 3, wherein said at least one light redirecting element configured with low birefringence has the retardation factor substantially not exceeding 50 nm.

5. A polarized light source according to claim 1, wherein the light directing assembly comprises a diffuser located in an optical path of pumping light propagating towards the optically active structure.

6. A polarized light source according to claim 5, wherein said diffuser is optically attached to the optically active structure.

7. A polarized light source according to claim 5, wherein said diffuser is configured with a haze factor between 50% and 95%.

8. A polarized light source according to claim 7, wherein said diffuser is configured with a haze factor between 80% and 95%.

9. A polarized light source according to claim 1, wherein the light directing assembly comprises at least one diffusive layer located in optical path of the emitted light propagating from the optically active structure.

10. A polarized light source according to claim 9, wherein one of said at least one diffusive layers is optically attached to the optically active structure.

11. A polarized light source according to claim 9, wherein said diffusive layer is configured with a haze factor between 50% and 95%.

12. A polarized light source according to claim 11, wherein said diffusive layer is configured with a haze factor between 80% and 95%.

13. A polarized light source according to claim 1, further comprising an optical pumping assembly configured to generate and direct pumping light for exciting said optically active structure, said optical pumping assembly is configured as a direct backlight pumping light assembly, directing pumping light onto said optically active structure along an axis substantially parallel to a light output direction of the polarized light source.

14. A polarized light source according to claim 1, further comprising an optical pumping assembly configured to generate and direct pumping light for exciting said optically active structure, said optical pumping assembly being configured as an edge-lit backlight pumping light assembly, directing pumping light onto said optically active structure along an axis substantially perpendicular to a light output direction of the polarized light source.

15. A polarized light source according to claim 1, further comprising a light guide unit configured for receiving pumping light from a pumping light source and for directing said pumping light towards the optically active structure.

16. A polarized light source according to claim 1, wherein said optically active structure further comprises a protective layer structure configured to provide at least one of mechanical support and strain protection and chemical protection to said optically active structure.

17. A polarized light source according to claim 16, wherein said protective layer structure comprises at least one of the following: a transparent encapsulating layer, a barrier layer and a mechanical support film.

18. A display device comprising the polarized light source of claim 1, and a spatial modulating unit configured for varying spatial distribution of output light of the polarized light source to thereby provide a displayed image.

* * * * *